(12) United States Patent
Hofmann et al.

(10) Patent No.: US 9,328,813 B2
(45) Date of Patent: May 3, 2016

(54) SYSTEMS AND METHODS FOR IMPLEMENTING BULK METALLIC GLASS-BASED STRAIN WAVE GEARS AND STRAIN WAVE GEAR COMPONENTS

(71) Applicant: California Institute of Technology, Pasadena, CA (US)

(72) Inventors: Douglas C. Hofmann, Altadena, CA (US); Brian Wilcox, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/177,608

(22) Filed: Feb. 11, 2014

(65) Prior Publication Data
US 2014/0224050 A1    Aug. 14, 2014

Related U.S. Application Data

(60) Provisional application No. 61/763,219, filed on Feb. 11, 2013.

(51) Int. Cl.
*F16H 37/02*    (2006.01)
*F16H 49/00*    (2006.01)

(52) U.S. Cl.
CPC ......... *F16H 49/001* (2013.01); *Y10T 29/49467* (2015.01); *Y10T 74/19642* (2015.01)

(58) Field of Classification Search
CPC .................................................. F16H 49/001
USPC .......................................................... 74/640
See application file for complete search history.

(56) References Cited

U.S. PATENT DOCUMENTS

| | | | |
|---|---|---|---|
| 3,986,412 A * | 10/1976 | Farley | ............ 74/661 |
| RE29,989 E | 5/1979 | Polk | |
| 4,173,393 A | 11/1979 | Maurer | |
| 4,202,404 A | 5/1980 | Carlson | |
| 4,711,795 A | 12/1987 | Takeuchi et al. | |
| 4,810,314 A | 3/1989 | Henderson et al. | |
| 4,812,150 A | 3/1989 | Scott | |
| 4,823,638 A | 4/1989 | Ishikawa et al. | |
| 4,851,296 A | 7/1989 | Tenhover et al. | |
| 5,288,344 A | 2/1994 | Peker et al. | |
| 5,772,803 A | 6/1998 | Peker et al. | |

(Continued)

FOREIGN PATENT DOCUMENTS

| | | |
|---|---|---|
| CN | 102563006 A | 7/2012 |
| EP | 0127366 A1 | 5/1984 |

(Continued)

OTHER PUBLICATIONS

Fu et al., "Sliding behavior of metallic glass Part I. Experimental investigations", Wear, 2001, vol. 250, pp. 409-419.

(Continued)

*Primary Examiner* — Ha D Ho
(74) *Attorney, Agent, or Firm* — KPPB LLP

(57) ABSTRACT

Bulk metallic glass-based strain wave gears and strain wave gear components. In one embodiment, a strain wave gear includes: a wave generator; a flexspline that itself includes a first set of gear teeth; and a circular spline that itself includes a second set of gear teeth; where at least one of the wave generator, the flexspline, and the circular spline, includes a bulk metallic glass-based material.

14 Claims, 22 Drawing Sheets

(56) References Cited

U.S. PATENT DOCUMENTS

| | | | |
|---|---|---|---|
| 6,162,130 | A | 12/2000 | Masumoto et al. |
| 6,273,322 | B1 | 8/2001 | Yamamoto et al. |
| 6,620,264 | B2 | 9/2003 | Kundig et al. |
| 6,771,490 | B2 | 8/2004 | Peker et al. |
| 6,843,496 | B2 | 1/2005 | Peker et al. |
| 6,887,586 | B2 | 5/2005 | Peker et al. |
| 7,073,560 | B2 | 7/2006 | Kang et al. |
| 7,075,209 | B2 | 7/2006 | Howell et al. |
| 7,357,731 | B2 | 4/2008 | Johnson et al. |
| 7,360,419 | B2 | 4/2008 | French et al. |
| 7,500,987 | B2 | 3/2009 | Bassler et al. |
| 7,552,664 | B2 * | 6/2009 | Bulatowicz ............... 74/640 |
| 7,896,982 | B2 | 3/2011 | Johnson et al. |
| 8,400,721 | B2 | 3/2013 | Bertele et al. |
| 8,485,245 | B1 | 7/2013 | Prest et al. |
| 8,613,815 | B2 | 12/2013 | Johnson et al. |
| 8,986,469 | B2 * | 3/2015 | Vecchio et al. ............... 148/403 |
| 2002/0053375 | A1 | 5/2002 | Hays et al. |
| 2002/0100573 | A1 | 8/2002 | Inoue et al. |
| 2003/0062811 | A1 | 4/2003 | Peker et al. |
| 2005/0127139 | A1 | 6/2005 | Slattery et al. |
| 2007/0034304 | A1 | 2/2007 | Inoue et al. |
| 2009/0114317 | A1 | 5/2009 | Collier et al. |
| 2010/0313704 | A1 | 12/2010 | Wang et al. |
| 2011/0048587 | A1 * | 3/2011 | Vecchio et al. ............... 148/561 |
| 2012/0073710 | A1 | 3/2012 | Kim et al. |
| 2012/0077052 | A1 | 3/2012 | Demetriou et al. |
| 2013/0139964 | A1 | 6/2013 | Hofmann et al. |
| 2014/0020794 | A1 | 1/2014 | Hofmann et al. |
| 2014/0093674 | A1 * | 4/2014 | Hofmann et al. ............ 428/66.1 |
| 2014/0141164 | A1 | 5/2014 | Hofmann |
| 2014/0202595 | A1 | 7/2014 | Hofmann |
| 2014/0227125 | A1 | 8/2014 | Hofmann |
| 2014/0246809 | A1 | 9/2014 | Hofmann |
| 2014/0312098 | A1 | 10/2014 | Hofmann et al. |
| 2014/0342179 | A1 | 11/2014 | Hofmann et al. |
| 2015/0047463 | A1 | 2/2015 | Hofmann et al. |
| 2015/0075744 | A1 | 3/2015 | Hofmann et al. |

FOREIGN PATENT DOCUMENTS

| | | |
|---|---|---|
| EP | 1063312 A1 | 12/2000 |
| EP | 1138798 A1 | 10/2001 |
| EP | 1404884 B1 | 7/2007 |
| EP | 1944138 A2 | 7/2008 |
| JP | 61276762 A | 12/1986 |
| JP | 2002045960 A | 2/2002 |
| WO | 2014004704 A1 | 1/2014 |
| WO | 2014058498 A3 | 4/2014 |
| WO | 2015042437 A1 | 3/2015 |
| WO | 2015156797 A1 | 10/2015 |

OTHER PUBLICATIONS

Kozachkov et al., "Effect of cooling rate on the volume fraction of B2 phases in a CuZrAlCo metallic glass matrix composite", Intermetallics, 2013, vol. 39, pp. 89-93.

International Preliminary Report on Patentability for International Application PCT/US2013/047950, Report completed Dec. 31, 2014, Mailed Jan. 8, 2015, 7 Pgs.

International Preliminary Report on Patentability for International Application PCT/US2013/050614, report Issued Jan. 20, 2015, Mailed Jan. 29, 2015, 9 Pgs.

International Search Report and Written Opinion for International Application PCT/US2014/033510, report completed Jan. 8, 2015, 2014, Mailed Jan. 8, 2015, 11 Pgs.

International Search Report and Written Opinion for International Application PCT/US2014/056615, report completed Dec. 29, 2014, Mailed Dec. 30, 2014, 13 Pgs.

Kim et al., "Weldability of Cu54Zr22Ti18Ni6 bulk metallic glass by ultrasonic welding processing", Materials Letters, 2014, 130, pp. 160-163.

International Search Report and Written Opinion for International Application No. PCT/US2013/050614, Search Completed May 7, 2014, Mailed May 7, 2014, 12 pgs.

"Harmonic Drive AG", website, printed from http://harmoncdrive.aero/?idcat=471, Feb. 20, 2014, 2 pgs.

"Harmonic Drive Polymer GmbH", printed Feb. 20, 2014 from http://www.harmonicdrive.de/English/the-company/subsidiaries/harmonic-drive-polymer-gmbh.html, 1 pg.

International Search Report and Written Opinion for International Application PCT/US2013/047950, completed Oct. 8, 2013, 9 pgs.

"Introduction to Thermal Spray Processing", ASM International, Handbook of Thermal Spray Technology (#06994G), 2004, 12 pgs.

Abrosimova et al., "Crystalline layer on the surface of Zr-based bulk metallic glasses", Journal of Non-Crystalline solids, 2001, vol. 288, pp. 121-126.

An et al., "Synthesis of single-component metallic glasses by thermal spray of nanodroplets on amorphous substrates", Applied Physics Letters, 2012, vol. 100, pp. 041909-1-041909-4.

Anstis et al., "A Critical Evaluation of Indentation Techniques for Measuring Fracture Toughness: I, Direct Crack Measurements", Journal of American Ceramic Society, Sep. 1981, vol. 64, No. 8, pp. 533-538.

Ashby et al., "Metallic glasses of structural materials", Scripta Materialia, 2006, vol. 54, pp. 321-326.

Bakkal, "Sliding tribological characteristics of Zr-based bulk metallic glass under lubricated conditions", Intermetallics, 2010, vol. 18, pp. 1251-1253.

Bardt et al., "Micromolding three-dimensional amorphous metal structures", J. Mater. Res, Feb. 2007, vol. 22, No. 2, pp. 339-343.

Basu et al., "Laser surface coating of Fe—Cr—Mo—Y—B—C bulk metallic glass composition on AISI 4140 steel", Surface & Coatings Technology, 2008, vol. 202, pp. 2623-2631.

Branagan et al., "Wear Resistant Amorphous and Nanocomposite Steel Coatings", Met. Mater. Trans. A, 2001, 32A; Idaho National Engineering and Environmental Laboratory, DOI 10.1007/s11661-001-0051-8, 15 pgs.

Cadney et al., "Cold gas dynamic spraying as a method for freeforming and joining materials", Science Direct, Surface & Coatings Technology, 202, 2008, pp. 2801-2806.

Calin et al., "Improved mechanical behavior of Cu—Ti-based bulk metallic glass by in situ formation of nanoscale precipitates", Scripta Materialia, 2003, vol. 48, pp. 653-658.

Chen et al., "Elastic Constants, Hardness and Their Implications to Flow Properties of Metallic Glasses", Journal of Non-Crystalline Solids, 1975, vol. 18, pp. 157-171.

Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652.

Cheng, "Characterization of mechanical properties of FeCrBSiMn-NbY metallic glass coatings", J Mater Sci., 2009, vol. 44, pp. 3356-3363.

Choi et al., "Tribological behavior of the kinetic sprayed $Ni_{59}Ti_{16}Zr_{20}Si_2Sn_3$", Journal of Alloys and Compounds, 2007, vol. 434-435, pp. 64-67.

Conner et al., "Shear band spacing under bending of Zr-based metallic glass plates", Acta Materialia, 2004, vol. 52, pp. 2429-2434.

Conner et al., "Shear bands and cracking of metallic glass plates in bending", Journal of Applied Physics, Jul. 15, 2003, vol. 94, No. 2, pp. 904-911.

Dai et al., "A new centimeter-diameter Cu-based bulk metallic glass", Scripta Materialia, 2006, vol. 54, pp. 1403-1408.

Davis, "Hardness/Strength Ratio of Metallic Glasses", Scripta Metallurgica, 1975, vol. 9, pp. 431-436.

De Beer et al., "Surface Folds Make Tears and Chips", Physics, 2012, vol. 100, 3 pgs.

Dislich et al., "Amorphous and Crystalline Dip Coatings Obtained from Organometallic Solutions: Procedures, Chemical Processes and Products", Metallurgical and Protective Coatings, 1981, vol. 77, pp. 129-139.

Duan et al., "Lightweight Ti-based bulk metallic glasses excluding late transition metals", Scripta Materialia, 2008, vol. 58, pp. 465-468.

(56) References Cited

OTHER PUBLICATIONS

Duan et al., "Tribological properties of $Zr_{41.25}Ti_{13.75}Ni_{10}Cu_{12.5}Be_{22.5}$ bulk metallic glasses under different conditions", Journal of Alloys and Compounds, 2012, 528, pp. 74-78.
Fleury et al., "Tribological properties of bulk metallic glasses", Materials Science and Engineering, 2004, vol. A375-377, pp. 276-279.
Fornell et al., "Enhanced mechanical properties and in vitro corrosion behavior of amorphous and devitrified $Tl_{40}Zr_{10}Cu_{38}Pd_{12}$ metallic glass", Journal of the Mechanical Behavior of Biomedical Materials, 2011, vol. 4, pp. 1709-1717.
Ganesan et al. "Bonding behavior studies of cold sprayed copper coating on the PVC polymer substrate", Surface & Coatings Technology, 2012, vol. 207, pp. 262-269.
Garrett et al., "Effect of microalloying on the toughness of metallic glasses", Applied Physics Letter, 2012, vol. 101, 241913-1-241913-3.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, 2003, vol. 316, pp. 96-103.
Greer, "Partially or fully devitrified alloys for mechanical properties", Materials and Science and Engineering, 2001, vol. A304, pp. 68-72.
Hale, "Principles and Techniques for Designing Precision Machines", Ph.D. Thesis, Feb. 1999, 493 pgs.
Haruyama et al., "Volume and enthalpy relaxation in $Zr_{55}Cu_{30}Ni_5Al_{10}$ bulk metallic glass", Acta Materialia, 2010, vol. 59, pp. 1829-1836.
Hejwowski et al., "A comparative study of electrochemical properties of metallic glasses and weld overlay coatings", Vacuum 88 (2013) 118-123.
Hofmann, "Bulk Metallic Glasses and Their Composites: A Brief History of Diverging Fields", Journal of Materials, 2013, vol. 2013, 7 pgs.
Hofmann, "Shape Memory Bulk Metallic Glass Composites", Science, Sep. 10, 2010, vol. 329, pp. 1294-1295.
Hofmann et al., "Designing metallic glass matrix composites with high toughness and tensile ductility", Nature Letters, Feb. 28, 2008, vol. 451, pp. 1085-1090.
Hofmann et al., "Semi-solid Induction Forging of Metallic Glass Matrix Composites", JOM, Dec. 2009, vol. 61, No. 12, pp. 11-17, plus cover.
Hong et al., "Dry sliding tribological behavior of Zr-based bulk metallic glass", Trans. Nonferrous Met. Soc. China, 2012, vol. 22, pp. 585-589.
Hong et al., "Microstructurel characteristics of high-velocity oxygen-fuel (HVOF) sprayed nickel-based alloy coating", Journal of Alloys and Compounds 581 (2013) pp. 398-403.
Huang et al., "Fretting wear behavior of bulk amorphous steel", Intermetallics, 2011, vol. 19, pp. 1385-1389.
Inoue et al., "Cobalt-based bulk glassy alloy with ultrahigh strength and soft magnetic properties", Nature Materials, Oct. 2003, vol. 2, pp. 661-663.
Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.
Ishida et al., "Wear resistivity of super-precision microgear made of Ni-based metallic glass", Materials Science and Engineering, 2007, vol. A449-A451, pp. 149-154.
Jiang et al., "Tribological Studies of a Zr-Based Glass-Forming Alloy with Different States", Advanced Engineering Materials, 2009, vol. 1, No. 11, pp. 925-931.
Abdeljawad, F. et al., Physical Review Letters, vol. 105, 205503, Sep. 17, 2010.
Cheng, J. L. et al., Intermetallics, vol. 18, Issue 12, Sep. 24, 2010, pp. 2425-2430.
Fan, C. et al., Applied Physics Letters, vol. 81, Issue 6, Aug. 5, 2002.
Ha, D. J. et al., Materials Science and Engineering: A, vol. 552, May 28, 2012, pp. 404-409.
Harmon, John S. et al., Physical Review Letters, vol. 99, 135502, Sep. 28, 2007.
Hays, C. C. et al., Physical Review Letters, vol. 84, 2901, Mar. 27, 2000.
Hofmann, D. C. et al., Proceedings of the National Academy of Science, vol. 105, Dec. 23, 2008, pp. 20136-20140.
Hofmann, D. C. et al., Material Science Forum, vol. 633-634, 2010, pp. 657-663.
Huang, Y. L. et al., Scripta Materialia, vol. 53, Mar. 29, 2005, pp. 93-97.
Kim, C. P. et al., Scripta Materialia, vol. 65, May 3, 2011, pp. 304-307.
Kuhn, U. et al. Materials Science and Engineering: A, vols. 375-377, 2004, pp. 322-326.
Kuhn, U. et al., Applied Physics Letters, vol. 80, No. 14, Apr. 8, 2002.
Launey, M. E. et al., Applied Physics Letters, vol. 94, 241910, 2009.
Lee, M. L. et al., Acta Materialia, vol. 52, Issue 14, Jun. 17, 2004, pp. 4121-4131.
Narayan, R. L. et al., Scripta Materialia, vol. 63, Issue 7, Jun. 9, 2010, pp. 768-771.
Oh, Y. S. et al., Acta Materialia, vol. 59, Issue 19, Sep. 23, 2011, pp. 7277-7286.
Pauly, S. et al., Nature Materials, vol. 9, Issue 6, May 16, 2010, pp. 473-477.
Qiao, J. W. et al., Materials Science and Engineering: A, vol. 527, Issues 29-30, Aug. 20, 2010, pp. 7752-7756.
Singer, I. L. et al., Wear, vol. 195, Issues 1-2, Jul. 1996, pp. 7-20.
Szuecs, F. et al., Acta Materialia, vol. 49, Issue 9, Feb. 2001, pp. 1507-1513.
Tan, H. et al., Intermetallics, vol. 10, Issues 11-12, Nov. 2002, pp. 1203-1205.
Wu, Hong et al., Transactions of Nonferrous Metals Society of China, vol. 22, Issue 3, Jan. 2012, pp. 585-589.
Zenebe et al., Tribology Letters, vol. 47, Issue 1, Apr. 28, 2012, pp. 131-138.
Zhu, Z. et al., Scripta Materialia, vol. 62, Issue 5, Nov. 18, 2009, pp. 278-281.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim, "Amorphous phase formation of Zr-based alloy coating by HVOF spraying process", Journal of Materials Science 36 (2001) pp. 49-54.
Kim et al. "Enhancement of metallic glass properties of Cu-based BMG coating by shroud plasma spraying", Science Direct, Surface & Coatings Technology 205 (2011) pp. 3020-3026.
Kim et al. "Oxidation and crystallization mechanisms in plasma-sprayed Cu-based bulk metallic glass coatings", Acta Materialia, 2010, vol. 58, pp. 952-962.
Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, vol. 51, No. 9 (2010) pp. 1609-1613.
Kobayashi et al., "Fe-based metallic glass coatings produced by smart plasma spraying process", Materials Science and Engineering, 2008, vol. B148, pp. 110-113.
Kobayashi et al., "Mechanical property of Fe-base metallic glass coating formed by gas tunnel type plasma spraying", ScienceDirect, Surface & Coatings Technology (2007), 6 pgs.
Kong et al., "Effect of Flash Temperature on Tribological Properties of Bulk Metallic Glasses", Tribol. Lett., 2009, vol. 35, pp. 151-158.
Kumar et al., "Bulk Metallic Glass: The Smaller the Better", Advanced Materials, 2001, vol. 23, pp. 461-476.
Kwon et al., "Wear behavior of Fe-based bulk metallic glass composites", Journal of Alloys and Compounds, 2011, vol. 509S, pp. S105-S108.
Launey et al., "Solution to the problem of the poor cyclic fatigue resistance of bulk metallic glasses", PNAS Early Edition, pp. 1-6.
Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.
List et al., "Impact Conditions for Cold Spraying of Hard Metallic Glasses", Journal of Thermal Spray Technology, Jun. 2012, vol. 21, No. 3-4, pp. 531-540.

(56) References Cited

OTHER PUBLICATIONS

Liu, "Microstructure and properties of Fe-based amorphous metallic coating produced by high velocity axial plasma spraying", Science Direct, Journal of Alloys and Compounds 484 (2009) pp. 300-307.

Liu et al., "Influence of Heat Treatment on Microstructure and Sliding Wear of Thermally Sprayed Fe-Based Metallic Glass coatings", Tribol. Lett., 2012, vol. 46, pp. 131-138.

Liu et al., "Metallic glass coating on metals plate by adjusted explosive welding technique", Applied Surface Science, 2009, vol. 255, pp. 9343-9347.

Liu et al., "Sliding Tribological Characteristics of a Zr-based Bulk Metallic Glass Near the Glass Transition Temperature", Tribol. Lett. 2009, vol. 33, pp. 205-210.

Liu et al., "Wear behavior of a Zr-based bulk metallic glass and its composites", Journal of Alloys and Compounds, 2010, vol. 503, pp. 138-144.

Lupoi et al. "Deposition of metallic coatings on polymer surfaces using cold spray", Science Direct, Surface & Coatings Technology 205 (2010) pp. 2167-2173.

Ma et al., "Wear resistance of Zr-based bulk metallic glass applied in bearing rollers", Materials Science and Engineering, 2004, vol. A386, pp. 326-330.

Maddala et al., "Effect of notch toughness and hardness on sliding wear of $Cu_{50}Hf_{41.5}A_{18.5}$ bulk metallic glass", Scripta Materialia, 2011, vol. 65, pp. 630-633.

Ni, "High performance amorphous steel coating prepared by HVOF thermal spraying", Journal of Alloys and Compounds 467 (2009) pp. 163-167.

Parlar et al., "Sliding tribological characteristics of Zr-based bulk metallic glass", Intermetallics, 2008, vol. 16, pp. 34-41.

Pauly et al., "Modeling deformation behavior of Cu—Zr—Al bulk metallic glass matrix composites", Applied Physics Letters, 2009, vol. 95, pp. 101906-1-101906-3.

Ponnambalam et al., "Fe-based bulk metallic glasses with diameter thickness larger than one centimeter", J Mater Res, 2004, vol. 19; pp. 1320-1323.

Porter et al., "Incorporation of Amorphous Metals into MEMS for High Performance and Reliability", Rockwell Scientific Company, Final Report, Nov. 2003, 41 pgs.

Prakash et al., "Sliding wear behavior of some Fe-, Co-and Ni-based metallic glasses during rubbing against bearing steel", Tribology Letters, 2000, vol. 8, pp. 153-160.

Ramamurty et al., "Hardness and plastic deformation in a bulk metallic glass", Acta Materialia, 2005, vol. 53, pp. 705-717.

Revesz et al. "Microstructure and morphology of Cu—Zr—Ti coatings produced by thermal spray and treated by surface mechanical attrition", ScienceDirect, Journal of Alloys and Compounds 509S (2011) S482-S485.

Rigney et al., "The Evolution of Tribomaterial During Sliding: A Brief Introduction", Tribol. Lett, 2010, vol. 39, pp. 3-7.

Roberts et al., "Cryogenic Charpy impact testing of metallic glass matrix composites", Scripta Materialia, 2011, 4 pgs.

Schuh et al., "A survey of instrumented indentation studies on metallic glasses", J. Mater. Res., Jan. 2004, vol. 19, No. 1, pp. 46-57.

Segu et al., "Dry Sliding Tribological Properties of Fe-Based Bulk Metallic Glass", Tribol. Lett., 2012, vol. 47, pp. 131-138.

Shen et al., "Exceptionally high glass-forming ability of an FeCoCrMoCBY alloy", Applied Physics, 2005, vol. 86, pp. 151907-1-151907-3.

Sundaram et al., "Mesoscale Folding, Instability, and Disruption of Laminar Flow in Metal Surfaces", Physical Review Letters, Sep. 7, 2012, vol. 109, pp. 106001-1-106001-5.

Tam et al., "Abrasion resistance of Cu based bulk metallic glasses", Journal of Non-Crystalline Solids, 2004, vol. 347, pp. 268-272.

Tam et al., "Abrasive wear of $Cu_{60}Zr_{30}Ti_{10}$ bulk metallic glass", Materials Science and Engineering, 2004, vol. A384 pp. 138-142.

Tao et al., "Effect of rotational sliding velocity on surface friction and wear behavior in Zr-based bulk metallic glass", Journal of Alloys and Compounds, 2010, vol. 492, pp. L36-L39.

Tao et al., "Influence of isothermal annealing on the micro-hardness and friction property in CuZrAl bulk metallic glass", Advanced Materials Research, 2011, vols. 146-147, pp. 615-618.

Tobler et al., "Cryogenic Tensile, Fatigue, and Fracture Parameters for a Solution-Annealed 18 Percent Nickel Maraging Steel", Journal of Engineering Materials and Technology, Apr. 1978, vol. 100, pp. 189-194.

Wagner, "Mechanical Behavior of 18 Ni 200 Grade Maraging Steel at Cyrogenic Temperatures", J Aircraft, Oct. 1986, vol. 23, No. 10, pp. 744-749.

Wang et al., "Progress in studying the fatigue behavior of Zr-based bulk-metallic glasses and their composites", Intermetallics, 2009, vol. 17, pp. 579-590.

Wikipedia, "Harmonic Drive", printed Feb. 20, 2014, 4 pgs.

Wu et al., "Bulk Metallic Glass Composites with Transformation-Mediated Work-Hardening and Ductility", Adv. Mater., 2010, vol. 22, pp. 2770-2773.

Wu et al., "Effects of environment on the sliding tribological behaviors of Zr-based bulk metallic glass", Intermetallics, 2012, vol. 25, 115-125.

Yin et al. "Microstructure and mechanical properties of a spray-formed Ti-based metallic glass former alloy", ScienceDirect, Journal of Alloys and Compounds 512 (2012) 241-245.

Zachrisson et al., "Effect of Processing on Charpy impact toughness of metallic glass matrix composites", J. Mater. Res., May 28, 2011, vol. 26, No. 10, pp. 1260-1268.

Zhang et al. "Robust hydrophobic Fe-based amorphous coating by thermal spraying", Applied Physics Letters 101, 2012, pp. 1216031-121603-4.

Zhang et al., "Abrasive and corrosive behaviors of Cu—Zr—Al—Ag—Nb bulk metallic glasses", Journal of Physics: Conference Series, 2009, vol. 144, pp. 1-4.

Zhang et al., "Wear behavior of a series of Zr-based bulk metallic glasses", Materials Science and Engineering, 2008, vol. A475, pp. 124-127.

Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. 1-2, pp. 344-350.

Zhuo, "Spray formed Al-based amorphous matrix nanocomposite plate", ScienceDirect, Journal of Alloys and Compounds 509 (2011) L169-L173.

Hu et al., "Crystallization Kinetics of the Cu47.5Zr74.5Al5 Bulk Metallic Glass under Continuous and Iso-thermal heating", Applied Mechanics and Materials, vols. 99-100, 2011, p. 1052-1058.

Song et al., "Strategy for pinpointing the formation of B2 CuZr in metastable CuZr-based shape memory alloys", Acta Materialia 59, 2011, 6620-6630.

Wu et al., "Formation of Cu—Zr—Al bulk metallic glass composites with improved tensile properties", Acta Materialia 59, 2011, pp. 2928-2936.

"Corrosion of Titanium and Titanium Alloys", Total Materia. http://www.totalmateria.com/Article24.htm, Published Sep. 2001, Accessed Feb. 16, 2016.

* cited by examiner

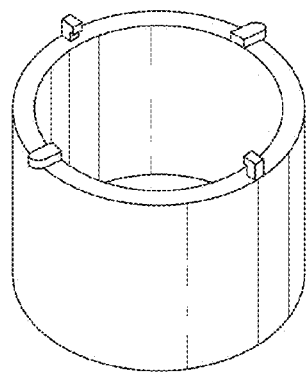
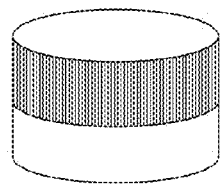
FIG. 15E
FIG. 15F

SYSTEMS AND METHODS FOR IMPLEMENTING BULK METALLIC GLASS-BASED STRAIN WAVE GEARS AND STRAIN WAVE GEAR COMPONENTS

CROSS-REFERENCE TO RELATED APPLICATIONS

The current application claims priority to U.S. Provisional Application No. 61/763,219, filed Feb. 11, 2013, the disclosure of which is incorporated herein by reference.

STATEMENT OF FEDERAL FUNDING

The invention described herein was made in the performance of work under a NASA contract, and is subject to the provisions of Public Law 96-517 (35 U.S.C. §202) in which the Contractor has elected to retain title.

FIELD OF THE INVENTION

The present invention generally relates to bulk metallic glass-based strain wave gears and strain wave gear components.

BACKGROUND

Strain wave gears, also known as harmonic drives, are unique gearing systems that can provide high reduction ratios, high torque-to-weight and torque-to-volume ratios, near-zero backlash (which can mitigate the potential wearing of the components), and a host of other benefits. Typically, strain wave gears include an elliptical wave generator that is fitted within a flexspline such that the flexspline conforms to the elliptical shape of the wave generator; this arrangement also typically includes a set of ball bearings that allow the flexspline to rotate about the central axis of the elliptical shape relative to the wave generator. The flexspline is generally disposed within a ring-shaped circular spline, where the flexspline includes a set of gear teeth along its outer, elliptically shaped, perimeter that engage with gear teeth disposed along the inner circumference of the rim-shaped circular spline. Typically, the flexspline has fewer teeth than the circular spline. Notably, the flexspline is made of a flexible material such that when gear teeth of the flexspline and circular spline are engaged, the wave generator can rotate relative to the circular spline in a first direction, and thereby cause the deformation and associated rotation of the flexspline in a second opposite direction. Normally, an input torque is provided to the wave generator, and the flexspline generates a resulting output torque. Typically, the rate of rotation of the wave generator is much greater than the rate of rotation of the flexspline. Thus, strain wave gears can achieve high reduction ratios relative to gearing systems and can do so in a smaller form factor.

Note that in some alternative arrangements, the flexspline is held fixed, and the circular spline is used to provide an output torque.

As can be inferred, the operation of a strain wave gear is particularly nuanced and relies on a very precisely engineered gearing system. For example, the geometries of the constituent parts of strain wave gears must be fabricated with extreme accuracy in order to provide the desired operation. Moreover, the strain wave gear components must be fabricated from materials that can provide for the desired functionality. In particular, the flexspline must be flexible enough to withstand high-frequency periodic deformation, while at the same time being strong enough to accommodate the loads that the strain wave gear is anticipated to be subjected to.

Because of these constraints, heritage strain wave gears have largely been fabricated from steel, as steel has been demonstrated to possess the requisite materials properties, and steel can be machined into the desired geometries. However, the machining of steel into the constituent components can be fairly expensive. For example, in many instances, steel-based strain wave gears can cost on the order of $1,000 to $2,000 largely because of the expensive manufacturing processes.

In some instances, harmonic drives are fabricated from thermoplastic materials. Thermoplastic materials (e.g. polymers) can be cast (e.g. via injection molding processes) into the shapes of the constituent components, and thereby circumvent the expensive machining processes that are typically implemented in manufacturing steel-based strain wave gears. However, strain wave gears fabricated from thermoplastics may not be as strong as strain wave gears fabricated from steel.

SUMMARY OF THE INVENTION

Systems and methods in accordance with embodiments of the invention implement bulk metallic glass-based strain wave gears and strain wave gear components. In one embodiment, a strain wave gear includes: a wave generator; a flexspline that itself includes a first set of gear teeth; and a circular spline that itself includes a second set of gear teeth; where at least one of the wave generator, the flexspline, and the circular spline, includes a bulk metallic glass-based material.

In another embodiment, the wave generator includes a wave generator plug and a bearing.

In yet another embodiment, the bearing is a ball bearing.

In another embodiment, each of the wave generator, the flexspline, and the circular spline, includes a bulk metallic glass-based material.

In yet another embodiment, at least one of the first set of gear teeth and the second set of gear teeth includes a bulk metallic glass-based material.

In still another embodiment, each of the first set of gear teeth and the second set of gear teeth includes a bulk metallic glass-based material.

In still yet another embodiment, the wave generator includes a ball bearing that itself includes a bulk metallic glass-based material.

In a still further embodiment, the element of the bulk metallic glass-based material that is present in the most amount is one of: Fe, Zr, Ti, Ni, Hf, and Cu.

In a yet further embodiment, the bulk metallic glass-based material is $Ni_{40}Zr_{28.5}Ti_{16.5}Al_{10}Cu_5$. In a still yet further embodiment, a wave generator includes: a wave generator plug that has a cross-section having an elliptical shape; and a bearing including an inner race, an outer race, and a plurality of rolling members; where the wave generator plug is disposed within the bearing, such that the bearing conforms to the elliptical shape of the wave generator plug; and where at least one of the wave generator plug and the bearing includes a bulk metallic glass-based material.

In another embodiment, the bearing is a ball bearing.

In yet another embodiment, a flexspline includes a flexible body defining a circular shape, where the perimeter of the circular shape define a set of gear teeth, and where the flexible body includes a bulk metallic glass-based material.

In still another embodiment, the set of gear teeth includes a bulk metallic glass-based material.

In still yet another embodiment, a circular spline includes a ring-shaped body where the inner perimeter of the ring-shaped body define a set of gear teeth, and where the ring-shaped body includes a bulk metallic glass-based material.

In a further embodiment, the set of gear teeth includes a bulk metallic glass-based material.

In a yet further embodiment, a method of fabricating a strain wave gear component includes shaping a BMG-based material using a mold in conjunction with one of a thermoplastic forming technique and a casting technique; where the BMG-based material is shaped into one of: a wave generator plug, an inner race, an outer race, a rolling element, a flexspline, a flexspline without a set of gear teeth, a circular spline, a circular spline without a set of gear teeth, a set of gear teeth to be incorporated within a flexspline, and a set of gear teeth to be incorporated within a circular spline.

In a still yet further embodiment, the method of fabricating a strain wave gear component further includes machining the BMG-based material after it has been shaped by either a thermoplastic forming technique or a casting technique.

In another embodiment, the BMG-based material is shaped into one of a flexspline without a set of gear teeth and a circular spline without a set of gear teeth, and gear teeth are machined onto the BMG-based material.

In yet another embodiment, the BMG-based material is shaped into one of a flexspline without a set of gear teeth and a circular spline without a set of gear teeth, and gear teeth are implemented onto the BMG-based material using a twin roll forming technique.

In still another embodiment, the BMG-based material is shaped using one of: a direct casting technique, a blow molding technique, and a centrifugal casting technique.

BRIEF DESCRIPTION OF THE DRAWINGS

FIGS. 15A-15F illustrate the formation of a flexspline according to the process outlined in FIG. 14 in accordance with embodiments of the invention.

DETAILED DESCRIPTION

Figure 1:
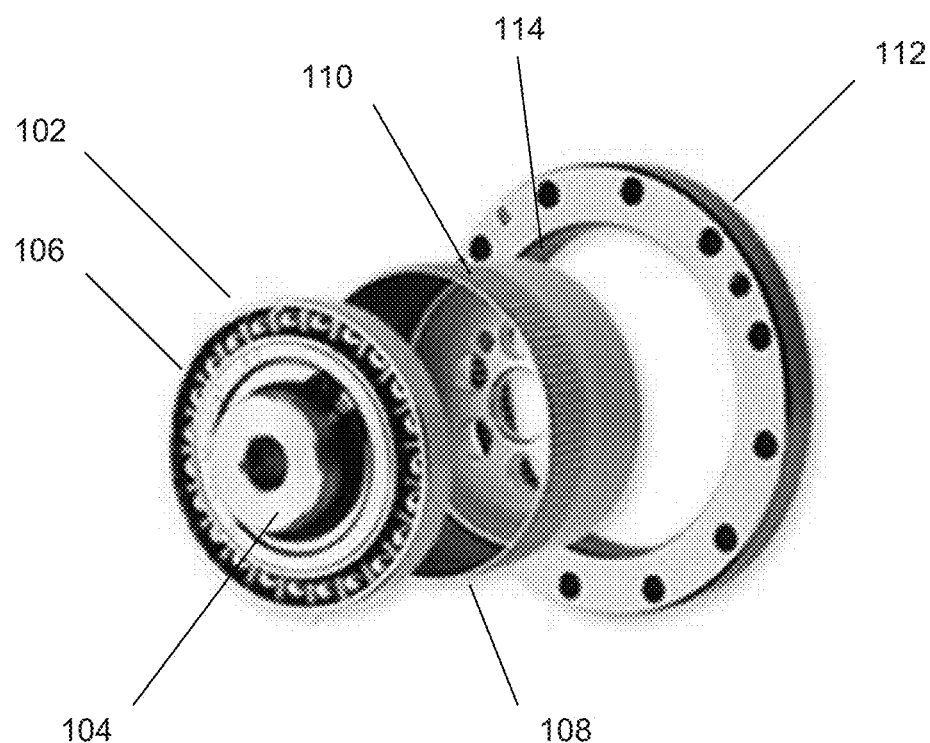
FIG. 1 illustrates a strain wave gear that can be fabricated from a BMG-based material in accordance with embodiments of the invention.

Turning now to the drawings, systems and methods for implementing bulk metallic glass-based strain wave gears and strain wave gear components are illustrated. In many embodiments, at least one of the wave generator, the flexspline, and the circular spline of a respective strain wave gear, includes a bulk metallic glass-based material. In a number of embodiments, at least the flexspline includes a bulk metallic glass-based material. In numerous embodiments, each of the wave generator, the flexspline, and the circular spline includes a bulk metallic glass-based material.

Metallic glasses, also known as amorphous alloys (or alternatively amorphous metals), are characterized by their disordered atomic-scale structure in spite of their metallic constituent elements—i.e., whereas conventional metallic materials typically possess a highly ordered atomic structure, metallic glass materials are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity. Importantly, the manufacture of metallic glass materials lends itself to relatively easy processing. In particular, the manufacture of a metallic glass can be compatible with an injection molding process, or any similar casting process.

Nonetheless, the manufacture of metallic glasses presents challenges that limit their viability as engineering materials. In particular, metallic glasses are typically formed by raising a metallic alloy above its melting temperature, and rapidly cooling the melt to solidify it in a way such that its crystallization is avoided, thereby forming the metallic glass. The first metallic glasses required extraordinary cooing rates, e.g., on the order of $10^6$ K/s, and were thereby limited in the thickness with which they could be formed. Indeed, because of this limitation in thickness, metallic glasses were initially limited to applications that involved coatings. Since then, however, particular alloy compositions that are more resistant to crystallization have been developed, which can thereby form metallic glasses at much lower cooling rates, and can therefore be made to be much thicker (e.g., greater than 1 mm). These thicker metallic glasses are known as 'bulk metallic glasses' ("BMGs".)

In addition to the development of BMGs, 'bulk metallic glass matrix composites' (BMGMCs) have also been developed. BMGMCs are characterized in that they possess the amorphous structure of BMGs, but they also include crystalline phases of material within the matrix of the amorphous structure. For example the crystalline phases can exist in the form of dendrites. The crystalline phases can allow the material to have enhanced ductility, compared to where the material is entirely constituted of the amorphous structure.

Even with these developments, the current state of the art has yet to fully appreciate the advantageous materials properties of BMG-based materials (throughout this application, the term 'BMG-based materials' is meant to be inclusive of BMGs and BMGMCs, except where otherwise noted). As a consequence, BMG-based materials have seen limited use in engineering applications. For example, various publications have concluded, and it is largely established, that the viability of BMG-based materials is mostly limited to microscale structures. (See e.g., G. Kumar et al., Adv. Mater. 2011, 23, 461-476, and M. Ashby et al., Scripta Materialia 54 (2006) 321-326, the disclosures of which are hereby incorporated by reference.) This is in part because the material properties, including the fracture mechanics, of BMG-based materials are correlated with the specimen size. For example, it has been observed that the ductility of a BMG material is inversely correlated with its thickness. (See e.g., Conner, Journal of Applied Physics, Volume 94, Number 2, Jul. 15, 2003, pgs. 904-911, the disclosure of which is hereby incorporated by reference.) Essentially, as component dimensions become greater, they become more and more prone to brittle failure. Thus, for these reasons and others, those skilled in the art have generally counseled that although BMG-based materials may make for excellent materials for microscale structures, e.g. MEMS devices, they generally should not be used for macroscale components. (See e.g., G. Kumar et al., Adv. Mater. 2011, 23, 461-476.) Indeed, G. Kumar et al. have related brittle failure to the plastic zone size, and have generalized that a specimen thickness of approximately 10 times the plastic zone radius can exhibit 5% bending plasticity. (Id.) Thus, G. Kumar et al. conclude that a 1 mm thick specimen of Vitreloy can exhibit 5% bend plasticity. (Id.)

While the conventional understanding has suggested that limited applications for BMG-based materials, it has also touted the wear-resistant aspects of BMG-based materials. (see e.g., Wu, Trans. Nonferrous Met. Soc. China 22 (2012), 585-589; Wu, Intermetallics 25 (2012) 115-125; Kong, Tribal Lett (2009) 35:151-158; Zenebe, Tribol Lett (2012) 47:131-138; Chen, J. Mater. Res., Vol. 26, No. 20, Oct. 28, 2011; Liu, Tribol Lett (2012) 46:131-138; the disclosures of which are hereby incorporated by reference.) To be clear, "wear" conventionally refers to the displacement of the surface of a material as a direct result of its mechanical interaction with another material. It is generally understood that a material's resistance to wear generally increases with its hardness, i.e. the harder a material is, the less susceptible it is to wear. (See e.g., I. L. Singer, Wear, Volume 195, Issues 1-2, July 1996, Pages 7-20.) Based on these understandings, it has been suggested that the predicted wear-resistance characteristics of BMGs may make them excellent candidates for materials from which to fabricate miniature gears, given that gears are subject to extensive mechanical interaction and are thereby subject to wear. (See e.g., Chen, J. Mater. Res., Vol. 26, No. 20, Oct. 28, 2011; Huang, Intermetallics 19 (2011) 1385-1389; Liu, Tribol Lett (2009) 33:205-210; Zhang, Materials Science and Engineering A, 475 (2008) 124-127; Ishida, Materials Science and Engineering A, 449-451 (2007) 149-154; the disclosures of which are hereby incorporated by reference.) Thus, in accordance with the above-described insights, gears on a microscale have been fabricated (See e.g., Ishida, Materials Science and Engineering A, 449-451 (2007) 149-154, the disclosure of which is hereby incorporated by reference.)

However, contrary to the above-described conventional wisdom, Hofmann et al. have demonstrated that BMG-based materials can be beneficially implemented in a variety of other applications. For example, U.S. patent application Ser. No. 13/928,109 to Hofmann et al. describes how BMG-based materials can be developed for the fabrication of gears on a macroscale. In particular, U.S. patent application Ser. No. 13/928,109 explains that while Ishida demonstrated the fabrication of BMG-based gears, the demonstration was limited inasmuch as the fabricated gears were of smaller dimensions (and thereby weren't subjected to the same modes of failure as macroscopic engineering component) and the gears operated using lubricant, which can mitigate tendencies for brittle fracture. (Id.) Generally, Hofmann et al. explain that the prior art has been principally concerned with harnessing the wear resistance properties of BMG-based materials, and consequently focused on implementing the hardest BMG-based materials. (Id.) This design methodology is limiting insofar as the hardest materials are more prone to other modes of failure. (Id.) Indeed, Hofmann et al. demonstrate that implementing the hardest BMG-based materials in the fabrication of macroscale gears generally yields gears that fracture during operation. (Id.) Accordingly, Hofmann et al. disclose that BMG-based materials can be developed to have favorable properties with respect to fracture toughness, and thereby can be made to fabricate macroscale gears that do not necessarily require lubricant to function. (Id.) The disclosure of U.S. patent application Ser. No. 13/928,109 is hereby incorporated by reference. Moreover, U.S. patent application Ser. No. 13/942,932 to Hofmann et al. discloses that BMG-based materials possess other favorable materials properties that can also allow them to be used in the fabrication of macroscale compliant mechanisms. The disclosure of U.S. patent application Ser. No. 13/942,932 is hereby incorporated by reference.

Against this background, it is apparent that the versatility of BMG-based materials has yet to be fully appreciated. The instant application discloses how BMG-based materials can be developed so that they can be incorporated within strain wave gears and strain wave gear components. For example, BMG-based materials can be developed so that they have high fatigue resistance, high fracture toughness, excellent sliding friction properties, a low density, and a high elasticity. Accordingly, when developed with these properties, BMG-based materials can be favorably implemented in the manufacture of the constituent components of strain wave gears, and thereby improve many aspects of the operation of strain wave gears. For example, strain wave gears that incorporate BMG-based materials can sustain greater operating loads, can be lighter, and can have longer life cycles. Moreover, as BMG-based materials can be cast or thermoplastically formed into desired geometries, they can be cast or thermoplastically formed into the shapes of the constituent parts of strain wave gears; in this way, the expensive machining processes that are ubiquitous in the manufacture of steel-based strain wave gears and strain wave gear components can be reduced if not eliminated. In short, strain wave gears and strain wave gear components that incorporate BMG-based materials can provide much improved performance at a lower cost. The general operation of strain wave gears is now discussed in detail below.

Strain Wave Gear Operation

In many embodiments of the invention, strain wave gears and strain wave gear components are provided that incorporate BMG-based materials and thereby have improved performance characteristics. To provide context, the basic operating principles of strain wave gears are now reviewed.

FIG. 1 illustrates an exploded view of a typical strain wave gear that can be fabricated from BMG-based materials in accordance with embodiments of the invention. In particular, the strain wave gear 100 includes a wave generator 102, a flexspline 108, and a circular spline 112. The illustrated wave generator 102 includes a wave generator plug 104 and a ball bearing 106. Importantly, the wave generator plug 104 is elliptical in shape, and is disposed within the ball bearing 106 so that the ball bearing 106 to conforms to the elliptical shape. In this arrangement, the outer race of the ball bearing 106 can rotate relative to the wave generator plug 104. In the illustrated embodiment, the flexspline 108 is depicted as being in the shape of a cup; notably, the outer rim of the cup includes a set of gear teeth 110. In the illustration, the flexspline is fitted over the ball bearing, such that the outer rim of the flexspline conforms to the aforementioned elliptical shape. Note that in this arrangement, the ball bearing allows the flexspline to rotate relative to the wave generator plug. The circular spline, 112 is in the shape of a ring; importantly, the inner perimeter of the ring includes a set of gear teeth. Normally, there are more gear teeth on the circular spline 114 than on the flexspline 110. In many instances there are two more gear teeth on the circular spline 112 than on the flexspline 108. Typically, the flexspline 108 is fitted within the circular spline 112 such that the gear teeth of the flexspline 110 engage the gear teeth of the circular spline 114. Notably, because the gear teeth of the flexspline 110 conform to an elliptical shape, only the gear teeth proximate the major axis of the elliptical shape engage the gear teeth of the circular spline 114 in the usual case. Conversely, the gear teeth of the flex spline 110 that are proximate the minor axis of the elliptical shape are disengaged from the gear teeth of the circular spline 114. In many instances, 30% of the gear teeth of the flexspline 110 are engaged with the gear teeth of the circular spline 114. With this arrangement, the wave generator plug 104 can rotate in a first direction about the central axis of the elliptical shape, and thereby cause the flexspline 108 to rotate in a second opposite direction and at a different rate of rotation (generally slower) about the central axis of the elliptical shape. This can be achieved as the flexspline 108 is made of a flexible material that can accommodate the deflections that may result from the rotation of the wave generator plug 104.

Figures 2A, 2B:
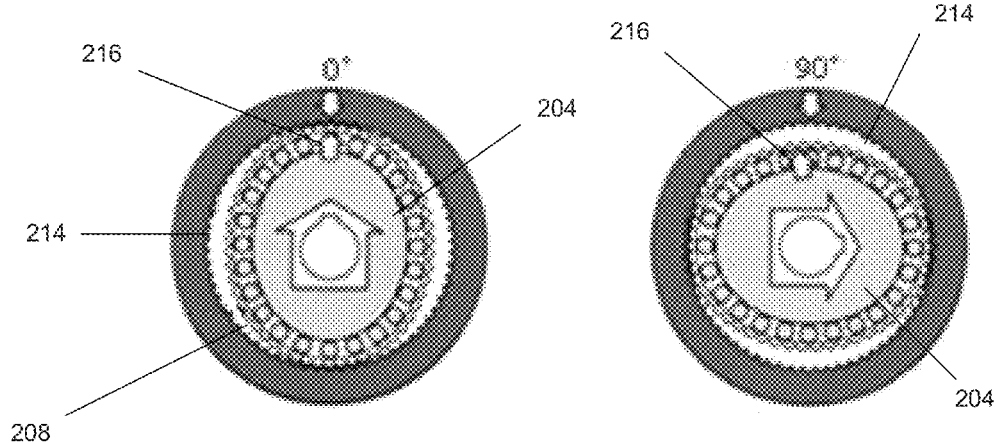
FIGS. 2A-2D illustrate the operation of a strain wave gear in accordance with embodiments of the invention.
Figures 2C, 2D:
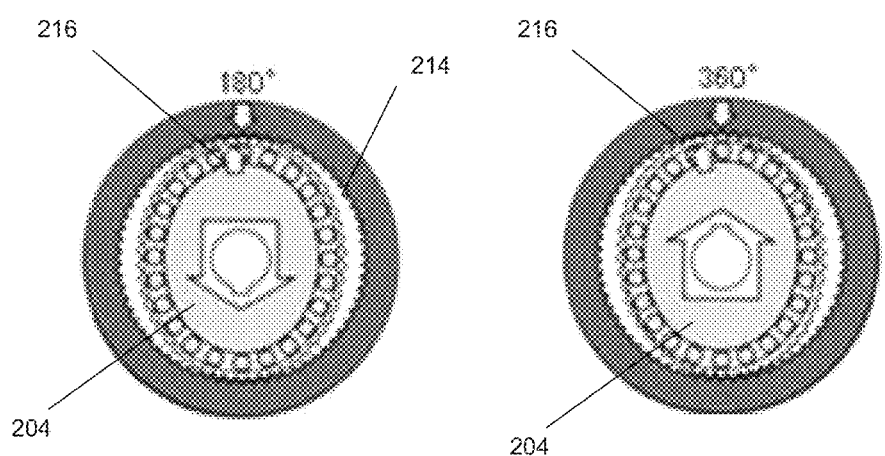

FIGS. 2A-2D depict the normal operation of a strain wave gear that can be fabricated from BMG-based materials in accordance with embodiments of the invention. In particular, FIG. 2A illustrates a strain wave gear, where the wave generator plug 204 is in a first orientation such that the major axis of the elliptical shape is vertical relative to the drawing. This starting position is designated as '0°'. An arrow 216 designates one of the gear teeth of the flexspline 208 that is considered in FIGS. 2A-2D for purposes of illustration. FIG. 2B illustrates that the wave generator plug 204 has rotated clockwise 90°. The rotation of the wave generator plug 204 has caused the flexspline 208 to deflect in a particular fashion; as a result, the gear tooth corresponding with the arrow 216 is disengaged from the gear teeth of the circular spline 214. Notably, the gear tooth corresponding with the arrow 216, has rotated slightly counterclockwise in association with the 90° clockwise rotation of the wave generator plug 204. FIG. 2C illustrates that the wave generator plug 204 has rotated clockwise another 90° so that it has now rotated 180° clockwise relative to the initial starting position. In the illustration, gear tooth designated by the arrow 216 has reengaged the gear teeth of the circular spline 214 at a position slightly counterclockwise relative to the initial starting position. FIG. 4D illustrates that the wave generator plug 204 has rotated a full 360° clockwise relative to the initial starting position. Consequently, the gear tooth indicated by 216 has rotated slightly further counterclockwise than the position seen in FIG. 2C. In general, it is seen in FIGS. 2A-2D that a full 360° rotation of a wave generator plug 204 in one direction results in a slight rotation of the flexspline 208 in an opposite direction. In this way, strain wave gears can achieve relatively high reduction ratio within a small footprint. Typically an input torque is applied to the wave generator plug 204, while the flexspline 208 provides a corresponding output torque.

Of course, it should be understood that while an example of a strain wave gear design is illustrated and discussed above, any suitable strain wave gear design and any suitable strain wave gear components can be fabricated from BMG-based materials in accordance with embodiments of the invention. For example, the flexspline can take any suitable shape, and is not required to be 'cup-shaped.' Similarly, any type of bearing can be implemented—not just a ball bearing. For example, needle roller bearings may be implemented. To be clear, the instant application is not meant to be limited to any particular strain wave gear design or strain wave gear component design. It is now discussed how BMG-based materials can be implemented within strain wave gear components to enhance the performance of strain wave gears in accordance with embodiments of the invention.

BMG-Based Strain Wave Gears and Strain Wave Gear Components

Figure 3:
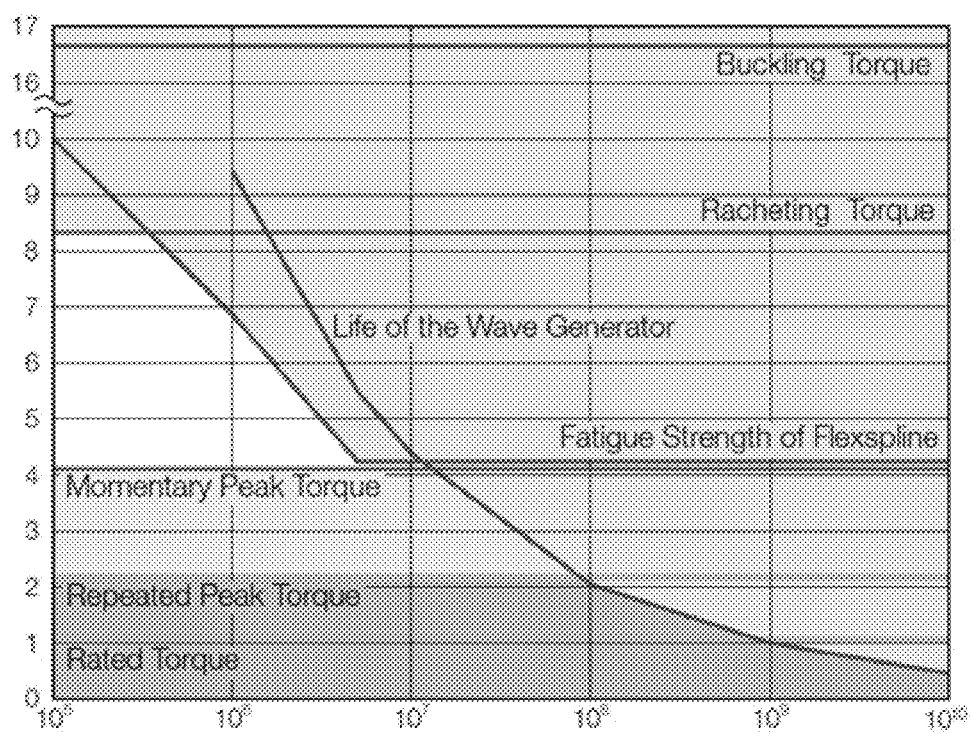
FIG. 3 illustrates the life expectancy of strain wave gears generally.

In many embodiments of the invention, BMG-based materials are incorporated within strain wave gears and/or strain wave gear components. In many instances, BMG-based materials can be developed to possess desired materials properties that can make them very-well suited for the fabrication of the constituent components of a strain wave gear. For example, from the above-described strain wave gear operating principles, it is evident that the ball bearing and the flexspline deflect in a periodic fashion with the rotation of the wave generator plug. As a result, it would be desirable that those components be fabricated from materials that have high fatigue strength. For example, FIG. 3 depicts how the fatigue strength of the flexspline is a principal determinant of the life of a strain wave gear. Notably, the flexspline in a strain wave gear typically fails when the flexspline fatigues (as opposed to other modes of failure), which causes it to permanently deform.

Generally, the fatigue limit of a material is defined by the number of times that the material can be stressed at a particular level before the material permanently deforms. Assuming the same cyclic load is applied many times, the lower the load, the longer the materials will last before it deforms. The cyclic load at which a material can survive $10^7$ cycles is generally referred to as the fatigue limit of the material. If the material is cycled loaded at its yield strength, it would presumably fail in one cycle. Thus, fatigue limits are generally reported as a percentage of their yield strength (to normalize their performance). As an illustration, a 300M steel has a fatigue limit which is 20% of its yield strength. If one assumes a fixed geometry of a part being fatigued, as with a flexspline, incorporating a more flexible material results in a lower stress per cycle, which can result in a much longer fatigue life.

Accordingly, BMG-based materials can be favorably incorporated within a flexspline of a strain wave gear to provide enhanced fatigue performance. For example, BMG-based materials can have an elastic limit as high as 2%, and can also have a stiffness about 3 times lower than steel-based materials. Generally, this implies that a flexspline fabricated from a BMG-based material can experience lower stress per unit of deformation relative to a steel-based flexspline having an identical geometry. Correspondingly, the BMG-based material can have much more favorable fatigue properties, e.g. a material that is subjected to less relative stress tends to be capable of withstanding more loading cycles. Note also that, the differing stiffness values impact the geometries of the fabricated components. Thus, because BMG-based materials can have relatively lower stiffness values (e.g. relative to steel), they can allow for strain wave gear components that have more favorable geometries. For example, a relatively lower stiffness can enable the implementation of a thicker flexspline, which can be advantageous. Indeed, the materials properties profile of BMG-based materials generally can enable the development of more favorable geometries—i.e. in addition to stiffness, the other materials properties of BMG-based materials can also contribute to the development of advantageous geometries.

Moreover, as is understood from the prior art, BMG-based materials can have higher hardness values, and correspondingly demonstrate improved wear performance relative to heritage engineering materials. Materials with high hardness values can be particularly advantageous in strain wave gears, as the constituent components of strain wave gears are in continuous contact with one another and are subject to, for example, sliding friction. Generally, when gear teeth are subjected to a constant load and accompanying friction, the resulting associated elastic deformation and wear can precipitate 'ratcheting'. That BMG-based materials can have a high hardness value, good resistance to wear (including a good resistance to galling), and high elasticity—even when subjected to high loads—can make them well-suited to be implemented within a strain wave gear. For example, the implementation of BMG-based materials within the gear teeth of a strain wave gear can deter ratcheting. Furthermore, BMG-based materials can be made to have a high hardness value throughout a broad temperature range. For example, BMG-based materials can have a hardness value that does not vary as a function of temperature by more than 20% within the temperature range of 100K to 300K. Indeed, BMG-based materials can have a strength that does not vary as a function of temperature by more than 20% within a temperature range of 100K to 300K. In general, the implementation of BMG-based materials within strain wave gears can be favorable on many levels. Table 1 below illustrates how the materials properties of certain BMG-based materials possess improved materials properties relative to heritage engineering materials in many respects.

TABLE 1

Material Properties of BMG-Based Materials relative to Heritage Engineering Materials

| Material | Density (g/cc) | Stiffness, E (GPa) | Tensile Yield (MPa) | Tensile UTS (MPa) | Elastic Limit (%) | Specific Strength | Hardness (HRC) |
|---|---|---|---|---|---|---|---|
| SS 15500 H1024 | 7.8 | 200 | 1140 | 1170 | <1 | 146 | 36 |
| Ti—6Al—4V STA | 4.4 | 114 | 965 | 1035 | <1 | 219 | 41 |
| Ti—6Al—6V—4Sn STA | 4.5 | 112 | 1035 | 1100 | <1 | 230 | 42 |
| Nitronic 60 CW | 7.6 | 179 | 1241 | 1379 | <1 | 163 | 40 |
| Vascomax C300 | 8.0 | 190 | 1897 | 1966 | <1 | 237 | 50 |
| Zr-BMG | 6.1 | 97 | 1737 | 1737 | >1.8 | 285 | 60 |
| Ti-BMGMC | 5.2 | 94 | 1362 | 1429 | >1.4 | 262 | 51 |
| Zr-BMGMC | 5.8 | 75 | 1096 | 1210 | >1.4 | 189 | 48 |

Importantly, materials properties of BMG-based materials are a function of the relative ratios of the constituent components and are also a function of the crystalline structure. As a result, the materials properties of a BMG-based material can be tailored by varying the composition and varying the ratio of crystalline structure to amorphous structure. For example, in many embodiments it may be desirable to implement BMG-based materials having a particular materials profile within a particular component of a strain wave gear. In these instances, an appropriate BMG-based material may be developed and/or selected from which to fabricate a respective strain wave gear component. Tables 2, 3, and 4 depict how materials properties of BMG-based materials can vary based on composition and crystalline structure.

TABLE 2

Material Properties of Select BMG-Based Materials as a function of Composition

| name | atomic % | weight % | BMG (%) | bcc (%) | $\rho$ (g/cm$^3$) | $\sigma_y$ (MPa) | $\sigma_{max}$ (MPa) | $\epsilon_y$ (%) | E (GPa) | $T_s$ (K) |
|---|---|---|---|---|---|---|---|---|---|---|
| DV2 | $Ti_{44}Zr_{30}V_{12}Cu_5Be_{19}$ | $Ti_{41.9}Zr_{36.3}V_{12.1}Cu_{6.3}Be_{3.4}$ | 70 | 30 | 5.13 | 1597 | 1614 | 2.1 | 94.5 | 956 |
| DV1 | $Ti_{48}Zr_{30}V_{12}Cu_5Be_{15}$ | $Ti_{44.3}Zr_{35.2}V_{11.8}Cu_{6.1}Be_{2.6}$ | 53 | 47 | 5.15 | 1362 | 1429 | 2.3 | 94.2 | 955 |
| DV3 | $Ti_{56}Zr_{18}V_{10}Cu_4Be_{12}$ | $Ti_{51.6}Zr_{31.6}V_{9.8}Cu_{4.9}Be_{1.1}$ | 46 | 54 | 5.08 | 1308 | 1309 | 2.2 | 84.0 | 951 |
| DV4 | $Ti_{62}Zr_{15}V_{10}Cu_4Be_9$ | $Ti_{57.3}Zr_{26.4}V_{9.8}Cu_{4.9}Be_{1.6}$ | 40 | 60 | 5.03 | 1086 | 1089 | 2.1 | 83.7 | 940 |
| DVAl1 | $Ti_{60}Zr_{16}V_9Cu_3Al_3Be_9$ | $Ti_{55.8}Zr_{38.4}V_{8.9}Cu_{3.7}Al_{1.6}Be_{1.6}$ | 31 | 69 | 4.97 | 1166 | 1189 | 2.0 | 84.2 | 901 |
| DVAl2 | $Ti_{67}Zr_{11}V_{10}Cu_5Al_2Be_5$ | $Ti_{62.4}Zr_{29.5}V_{9.9}Cu_{6.2}Al_1Be_{0.9}$ | 20 | 80 | 4.97 | 990 | 1000 | 2.0 | 78.7 | 998 |
| Ti-6-4a | $Ti_{86.1}Al_{10.3}V_{3.6}$ | $Ti_{95}Al_6V_4$(Grade 5 Annealed) | na | na | 4.43 | 754 | 882 | 1.0 | 113.8 | 1877 |
| Ti-6-4s | $Ti_{86.1}Al_{10.3}V_3$[Ref] | $Ti_{90}Al_6V_4$(Grade 5 STA) | na | na | 4.43 | 1100 | 1170 | ~1 | 114.0 | 1877 |
| CP-Ti | $Ti_{100}$ | $Ti_{100}$(Grade 2) | na | na | 4.51 | 380 | 409 | 0.7 | 105.0 | ~1930 |

TABLE 3

Material Properties of Select BMG-Based Materials as a function of Composition

| Alloy | $\sigma_{max}$ (MPa) | $\epsilon_{tot}$ (%) | $\sigma_y$ (MPa) | $\epsilon_y$ (%) | E (GPa) | $\rho$ (g/cm$^3$) | G (GPa) | CIT (J) | RoA (%) | $v$ |
|---|---|---|---|---|---|---|---|---|---|---|
| $Zr_{36.6}Ti_{31.4}Nb_7Cu_{5.9}Be_{19.1}$ (DH1) | 1512 | 9.58 | 1474 | 1.98 | 84.3 | 5.6 | 30.7 | 26 | 44 | 0.371 |
| $Zr_{38.3}Ti_{32.9}Nb_{7.3}Cu_{6.2}Be_{15.3}$ (DH2) | 1411 | 10.8 | 1367 | 1.92 | 79.2 | 5.7 | 28.8 | 40 | 50 | 0.373 |
| $Zr_{39.6}Ti_{33.9}Nb_{7.6}Cu_{6.4}Be_{12.5}$ (DH3) | 1210 | 13.10 | 1096 | 1.62 | 75.3 | 5.8 | 27.3 | 45 | 46 | 0.376 |
| $Zr_{41.2}Ti_{13.8}Cu_{12.5}Ni_{10}Be_{22.5}$ (Vitreloy 1) | 1737 | 1.98 | — | — | 97.2 | 6.1 | 35.9 | 8 | 0 | 0.355 |
| $Zr_{56.2}Ti_{13.8}Nb_{5.0}Cu_{6.9}Ni_{5.6}Be_{12.5}$ (LM 2) | 1302 | 5.49 | 1046 | 1.48 | 78.8 | 6.2 | 28.6 | 24 | 22 | 0.375 |

TABLE 4

Material Properties as a Function of Composition and Structure, where A is Amorphous, X, is Crystalline, and C is Composite

| | A/X/C | 2.0 Hv | E (GPa) |
|---|---|---|---|
| (CuZr42Al7Be10)Nb3 | A | 626.5 | 108.5 |
| (CuZr46Al5Y2)Nb3 | A | 407.4 | 76.9 |
| (CuZrAl7Be5)Nb3 | A | 544.4 | 97.8 |
| (CuZrAl7Be7)Nb3 | A | 523.9 | 102.0 |
| Cu40Zr40Al10Be10 | A | 604.3 | 114.2 |
| Cu41Zr40Al7Be7Co5 | C | 589.9 | 103.5 |
| Cu42Zr41Al7Be7Co3 | A | 532.4 | 101.3 |
| Cu47.5Zr48Al4Co0.5 | X | 381.9 | 79.6 |
| Cu47Zr46Al5Y2 | A | 409.8 | 75.3 |
| Cu50Zr50 | X | 325.9 | 81.3 |
| CuZr41Al7Be7Cr3 | A | 575.1 | 106.5 |
| CuZrAl5Be5Y2 | A | 511.1 | 88.5 |
| CuZrAl5Ni3Be4 | A | 504.3 | 95.5 |
| CuZrAl7 | X | 510.5 | 101.4 |
| CuZrAl7Ag7 | C | 496.1 | 90.6 |
| CuZrAl7Ni5 | X | 570.0 | 99.2 |
| Ni40Zr28.5Ti16.5Be15 | C | 715.2 | 128.4 |
| Ni40Zr28.5Ti16.5Cu5Al10 | X | 627.2 | 99.3 |
| Ni40Zr28.5Ti16.5Cu5Be10 | C | 668.2 | 112.0 |
| Ni56Zr17Ti13Si2Sn3Be9 | X | 562.5 | 141.1 |
| Ni57Zr18Ti14Si2Sn3Be6 | X | 637.3 | 139.4 |
| Ti33.18Zr30.51Ni5.33Be22.88Cu8.1 | A | 486.1 | 96.9 |
| Ti40Zr25Be30Cr5 | A | 465.4 | 97.5 |
| Ti40Zr25Ni8Cu9Be18 | A | 544.4 | 101.1 |
| Ti45Zr16Ni9Cu10Be20 | A | 523.1 | 104.2 |
| Vit 1 | A | 530.4 | 95.2 |
| Vit105 (Zr52.5Ti5Cu17.9Ni14.6Al10) | A | 474.4 | 88.5 |
| Vit 106 | A | 439.7 | 83.3 |
| Zr55Cu30Al10Ni5 | A | 520.8 | 87.2 |
| Zr65Cu17.5Al7.5Ni10 | A | 463.3 | 116.9 |
| DH1 | C | 391.1 | 84.7 |
| GHDT (Ti30Zr35Cu8.2Be26.8) | A | 461.8 | 90.5 |

Figure 5:
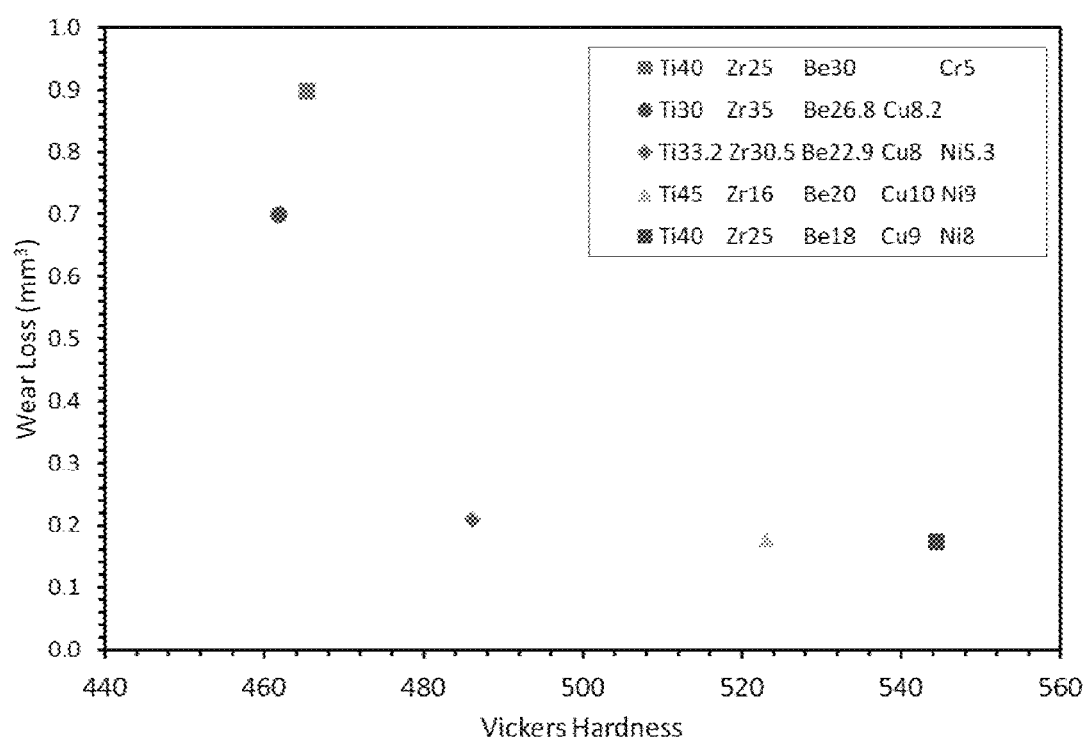
FIG. 5 illustrates the wear-resistance properties of titanium BMG-based materials that can be implemented within strain wave gear components in accordance with embodiments of the invention.

FIG. 5 illustrates how the hardness of a titanium BMG-based material varies in relation to the composition of the alloy. Generally, titanium BMG-based alloys tend to possess a number of characteristics that make them particularly well-suited for the fabrication of strain wave gears and strain wave gear components.

Tables 5 and 6 below list reported data as to how fatigue characteristics with BMG-based materials vary as a function of composition.

TABLE 5

Fatigue Characteristics as a Function of Composition

| Material | Fracture strength (MPa) | Geometry (mm) | Loading mode[a] | Frequency (Hz) | R-Ratio | Fatigue limit (MPa) | Fatigue ratio[b] |
|---|---|---|---|---|---|---|---|
| $Zr_{56.2}Cu_{0.9}Ni_{5.6}Ti_{13.8}Nb_{5.0}Be_{12.5}$ Composites [62] | 1480 | 3 × 3 × 30 | 4PB | 25 | 0.1 | ~296 | 0.200 |
| $Zr_{41.2}Cu_{12.5}Ni_{10}Ti_{13.8}Be_{22.5}$ [49] | 1900 | 3 × 3 × 50 | 4PB | 25 | 0.1 | ~152 | 0.080 |
| $Zr_{41.2}Cu_{12.5}Ni_{10}Ti_{13.8}Be_{22.5}$ [74] | 1900 | 2 × 2 × 60 | 3PB | 10 | 0.1 | 768 | 0.404 |
| $Zr_{41.2}Cu_{12.5}Ni_{10}Ti_{13.8}Be_{22.5}$ [74] | 1900 | 2 × 2 × 60 | 3PB | 10 | 0.1 | 359 | 0.189 |
| $Zr_{44}Ti_{11}Ni_{10}Cu_{18}Be_{25}$ [75] | 1900 | 23 × 20 × 85 | 4PB | 5-20 | 0.3 | 550 | 0.289 |
| $Zr_{44}Ti_{11}Ni_{10}Cu_{18}Be_{25}$ [75] | 1900 | 23 × 20 × 85 | 4PB | 5-20 | 0.3 | 390 | 0.205 |
| $Zr_{52.5}Cu_{13.0}Al_{10}Ni_{14.5}Ti_6$ [77] | 1700 | 3.5 × 3.5 × 30 | 4PB | 10 | 0.1 | 850 | 0.500 |

TABLE 5-continued

Fatigue Characteristics as a Function of Composition

| Material | Fracture strength (MPa) | Geometry (mm) | Loading mode[a] | Frequency (Hz) | R-Ratio | Fatique limit (MPa) | Fatique ratio[b] |
|---|---|---|---|---|---|---|---|
| $Zr_{58}Ni_{13.5}Cu_{18}Al_{10.4}I_{10.5}Nb_5$[76] | 1700 | 2 × 2 × 25 | 4PB | 10 | 0.1 | 559 | 0.329 |
| $Zr_{59}Cu_{30}Ni_5Al_{10}$ [78] | 1560 | 2 × 20 × 50 | Plate bend | 40 | 0.1 | 410 | 0.263 |

TABLE 6

Fatigue Characteristics as a Function of Composition

| Material | Fracture strength (MPa) | Geometry (mm) | Loading mode[a] | Frequency (Hz) | R-Ratio | Fatique limit (MPa) | Fatique ratio |
|---|---|---|---|---|---|---|---|
| $Zr_{56.2}Cu_{8.0}Ni_{8.8}Ti_{13.8}Nb_{5.0}Be_{12.5}$ Composites [56] | 1480 | ⌀2.98 | TT | 10 | 0.1 | 239 | 0.161 |
| $Zr_{50}Cu_{10}Al_{10}Ni_8$ Nano [85] | 1700 | 2 × 4 × 20 | TT | 10 | 0.1 | ~340 | 0.200 |
| $Zr_{41.3}Cu_{12.5}Ni_{80}Ti_{13.8}Be_{22.5}$ [55] | 1850 | ⌀2.98 | TT | 10 | 0.1 | 703 | 0.380 |
| $Zr_{41.3}Cu_{12.8}Ni_{80}Ti_{13.8}Be_{22.5}$ [55] | 1850 | ⌀2.98 | TT | 10 | 0.1 | 615 | 0.332 |
| $Zr_{41.3}Cu_{12.8}Ni_{80}Ti_{13.8}Be_{22.5}$ [56] | 1850 | ⌀2.98 | TT | 10 | 0.1 | 567 | 0.306 |
| $Zr_{41.3}Cu_{12.8}Ni_{80}Ti_{13.8}Be_{22.5}$ [80] | 1900 | — | CC | 5 | 0.1 | ~1050 | 0.553 |
| $Zr_{41.3}Cu_{12.8}Ni_{80}Ti_{13.8}Be_{22.5}$ [80] | 1900 | — | TC | 5 | −1 | ~150 | 0.079 |
| $Zr_{80}Cu_{80}Al_{10}$ [53] | 1821 | ⌀2.98 | TT | 10 | 0.1 | 752 | 0.413 |
| $Zr_{80}Cu_{80}Al_{10}Ni_{10}$ [53] | 1900 | ⌀2.98 | TT | 10 | 0.1 | 865 | 0.455 |
| $Zr_{80}Cu_{53}Al_{10}Pd_3$ [57] | 1899 | ⌀2.98 | TT | 10 | 0.1 | 983 | 0.518 |
| $Zr_{80}Cu_{53}Al_{10}Pd_3$ [81] | 1899 | ⌀5.33 | TT | 10 | 0.1 | ~900 | 0.474 |
| $Zr_{82.5}Cu_{12.5}Al_{10}Ni_{14.0}Ti_8$ [82] | 1660 | 6 × 3 × 1.5 | TT | 1 | 0.1 | — | — |
| $Zr_{82.5}Cu_{12.5}Al_{10}Ni_{14.0}Ti_8$ [51] | 1700 | ⌀2.98 | TT | 10 | 0.1 | 907 | 0.534 |
| $Zr_{88}Cu_{20}Al_{10}Ni_8Ti_3$ [82] | 1580 | 6 × 3 × 1.5 | TT | 1 | 0.1 | — | — |
| $Zr_{88}Cu_{20}Al_{10}Ni_8$ [84] | 1300 | 3 × 4 × 16 | TT | 20 | 0.1 | ~280 | 0.215 |
| $Zr_{88}Cu_{20}Al_{10}Ni_8$ [83] | 1560 | 1 × 2 × 5 | TT | 0.13 | 0.5 | — | — |

Figure 4A:
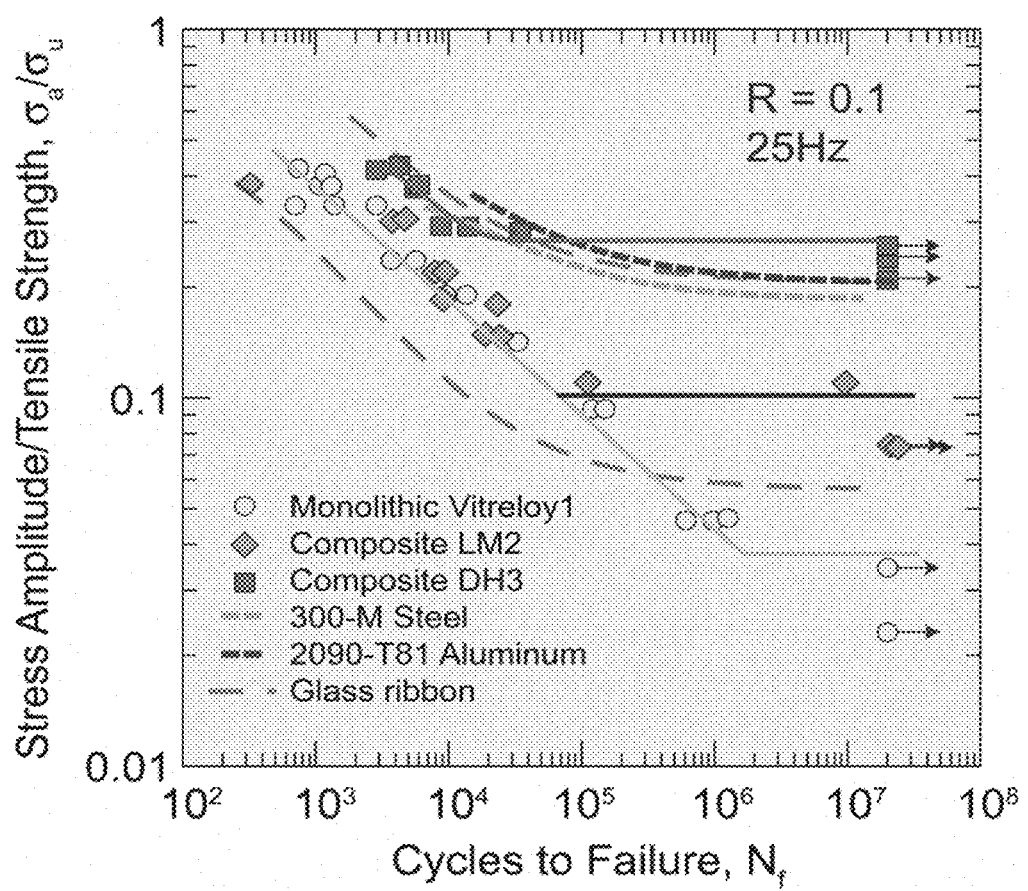
FIGS. 4A-4B illustrate the fatigue properties of BMG-based materials that can be implemented within strain wave gear components in accordance with embodiments of the invention.
Figure 4B:
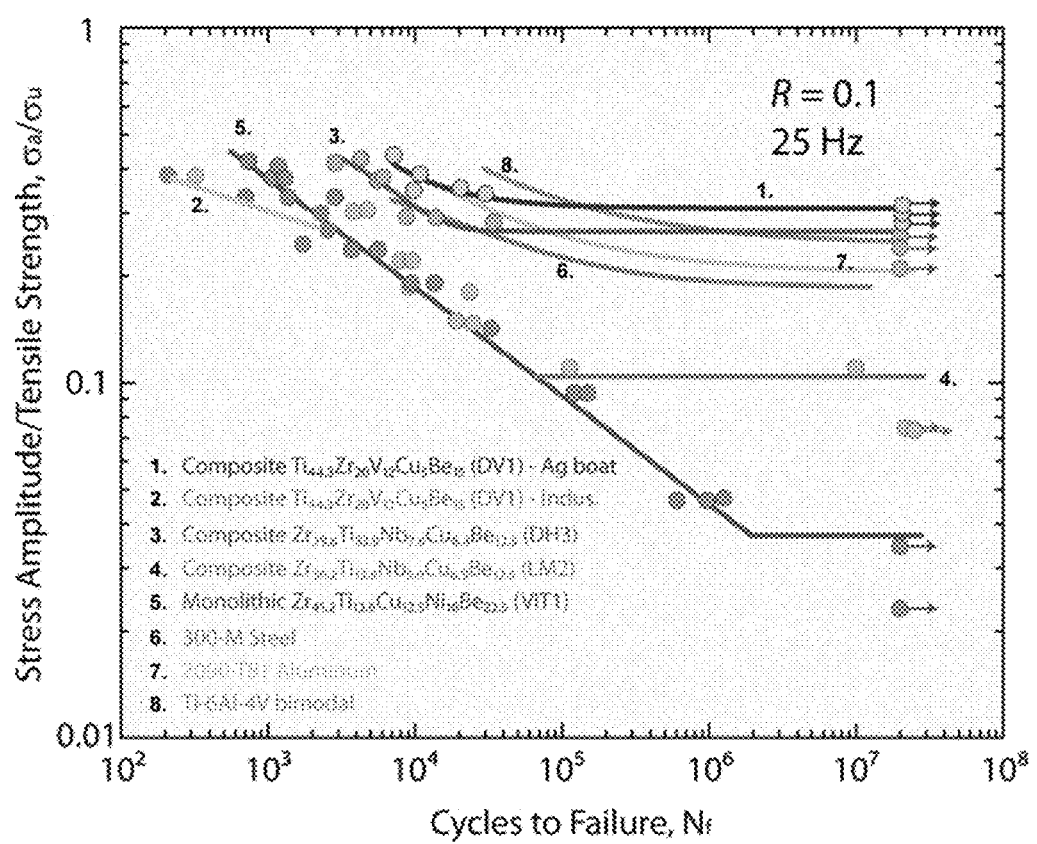

Although the data in tables 5 and 6 has been reported, one of the inventors of the instant application conducted independent fatigue tests, which to some extent contradict the reported values. FIGS. 4A and 4B depict the results of the conducted tests.

In particular, FIG. 4A illustrates the fatigue resistance of Monolithic Vitreloy1, Composite LM2, Composite DH3, 300-M Steel, 2090-T81 Aluminum, and Glass Ribbon. From these results, it is demonstrated that Composite DH3 exhibits a high resistance to fatigue failure. For example, Composite DH3 shows that it can survive approximately 20,000,000 cycles at a stress amplitude/tensile strength ratio of about 0.25. Note that monolithic Vitreloy 1 shows relatively poor resistance to fatigue failure, which appears to contravene the results shown in Tables 5 and 6. This discrepancy may be in part due to the rigor under which the data was obtained. In particular, as the inventor of the instant application realized that resistance to fatigue is a critical material property in determining suitability for various applications, he obtained fatigue resistance data that was procured under the most stringent testing conditions. FIG. 4A is reproduced from Launey, PNAS, Vol. 106, No. 13, 4986-4991, the disclosure of which is hereby incorporated by reference (and of which the one of the instant Inventors is a listed coauthor).

Similarly, FIG. 4B illustrates the fatigue resistance of DV1 ('Ag boat'—i.e., manufactured using semisolid processing), DV1 ('indus.'—manufactured using industry standard procedures), Composite DH3, Composite LM2, Monolithic Vitreloy1, 300-M Steel, 2090-T81 Aluminum, and Ti-6Al-4V bimodal. These results indicate that Composite DV1 (Ag boat) exhibits even greater resistance to fatigue failure than Composite DH3. Note that the results of the Composite DV1 testing varied greatly based on how the Composite DV1 was manufactured. When it was manufactured using 'Ag boat' techniques ('Ag boat' refers to semisolid manufacturing techniques, which are described in Hofmann, JOM, Vol. 61, No. 12, 11-17, the disclosure of which is hereby incorporated by reference.), it displayed far superior resistance to fatigue as compared to when it was manufactured using industry standard techniques. The inventors of the instant application believe that this discrepancy is due to the fact that industry standard manufacturing processes do not provide the type of rigor necessary to produce sufficiently pure materials, and this may be a function of the industry not recognizing how critical material composition is in determining material properties, including resistance to fatigue failure. FIG. 4B was produced by Launey in a collaboration that resulted in FIG. 4A, but FIG. 4B was not published in the above-cited article.

In general, FIGS. 4A and 4B indicate that BMG-based materials can be developed to have better fatigue characteristics than steel and other heritage engineering materials. Importantly, FIGS. 4A and 4B depict relative stress amplitude ratios, and as can be gleaned from table 1, BMG-based materials can be made to possess greater ultimate tensile strengths than many steels. Thus, BMG-based materials can be made to withstand more loading cycles at higher stress levels than some steels. Moreover, as BMG-based materials can be made to be less stiff, they can be made to experience less stress per unit deflection, which can thereby result in even greater fatigue performance.

From the above, it is clear that BMG-based materials can possess advantageous materials properties that can make them very well-suited for implementation within strain wave gear components. Any of the listed BMG-based materials can be implemented within strain wave gear components in accordance with embodiments of the invention. More generally, BMG-based materials can be tailored (e.g. via alloying and/or heat treating) to obtain a material having the desired materials profile for implementation within a strain wave gear in accordance with embodiments of the invention. Generally, a desired material property profile can be determined for a respective strain wave gear component, and a BMG-based material conforming to the material property profile can be developed and implemented.

For example, in many embodiments where a less stiff material is desired, the relative ratios of B, Si, Al, Cr, Co, and/or Fe within a BMG-based composition is reduced. Similarly, in many embodiments where a less stiff material is desired, the volume fraction of soft, ductile dendrites is increased; or alternatively, the amount of beta stabilizing elements, e.g. V, Nb, Ta, Mo, and/or Sn, are increased. Generally, in BMG-MCs, the stiffness of a material changes in accordance with the rule of mixtures, e.g., where there are relatively more dendrites, the stiffness decreases, and where there are relatively less dendrites, the stiffness increases. Note that, generally speaking, when modifying the stiffness of BMG-based materials, the stiffness is modified largely without overly influencing other properties, e.g. elastic strain limit or the processability of the BMG-based material. The ability to tune the stiffness independent of other material properties or influencing processability is greatly advantageous in designing strain wave gears and strain wave gear components.

Moreover, just as the stiffness of BMG-based materials can be tuned, the resistance to fatigue failure can also be tuned in accordance with embodiments of the invention. The alloying elements used to improve resistance to fatigue failure are largely experimentally determined. However, it has been observed that the same processing techniques that are used to enhance fracture toughness also tend to beneficially influence resistance to fatigue failure.

In any case, as should be clear from the above, any of the above-listed and described BMG-based materials can be incorporated within strain wave gears and strain wave gear components in accordance with embodiments of the invention. More generally, any BMG-based material can be implemented within strain wave gears and strain wave gear components in accordance with embodiments of the invention. For example, in many embodiments the implemented BMG-based material is based in Fe, Zr, Ti, Ni, Hf, or Cu (i.e. those respective elements are present in the material in greater amounts than any other element). In some embodiments, a BMG-based material that is implemented within a strain wave gear component is a Cu—Zr—Al—X composition, where X can be one or more element, including for example: Y, Be, Ag, Co, Fe, Cr, C, Si, B, Mo, Ta, Ti, V, Nb, Ni, P, Zn, and Pd. In several embodiments, a BMG-based material that is implemented within a strain wave gear component is a Ni—Zr—Ti—X composition, where X can be one or more element, including for example Co, Al, Cu, B, P, Si, Be, and Fe. In a number of embodiments, a BMG-based material that is implemented within a strain wave gear component is a Zr—Ti—Be—X composition, where X can be one or more element, including for example Y, Be, Ag, Co, Fe, Cr, C, Si, B, Mo, Ta, Ti, V, Nb, Ni, P, Zn, and Pd. In some embodiments, a strain wave gear component includes a BMG-based material that is $Ni_{40}Zr_{28.5}Ti_{16.5}Al_{10}Cu_5$ (atomic percent). In several embodiments a strain wave gear component includes a BMG-based material that is $(Cu_{50}Zr_{50})_xAl_{1-12}Be_{1-20}Co_{0.5-5}$. In many embodiments, a desired materials profile is determined for a given strain wave gear component, and a BMG-based material that possess the desired characteristics is used to construct the strain wave gear component. As BMG-based materials can possess many advantageous traits, their implementation within strain wave gear components can result in much more robust strain wave gears. The design methodology and fabrication of BMG-based strain wave gears is now discussed in greater detail below.

Fabrication of BMG-Based Strain Wave Gears and Strain Wave Gear Components

In many embodiments of the invention, strain wave gear components are fabricated from BMG-based materials using casting or thermoplastic forming techniques. Using casting or thermoplastic forming techniques can greatly enhance the efficiency by which strain wave gears and strain wave gear components are fabricated. For example, steel-based strain wave gear components are typically machined; because of the intricacy of the constituent components, the machining costs can be fairly expensive. By contrast, using casting or thermoplastic forming techniques in the development of strain wave gear components can circumvent excessive costly machining processes.

Figure 6:
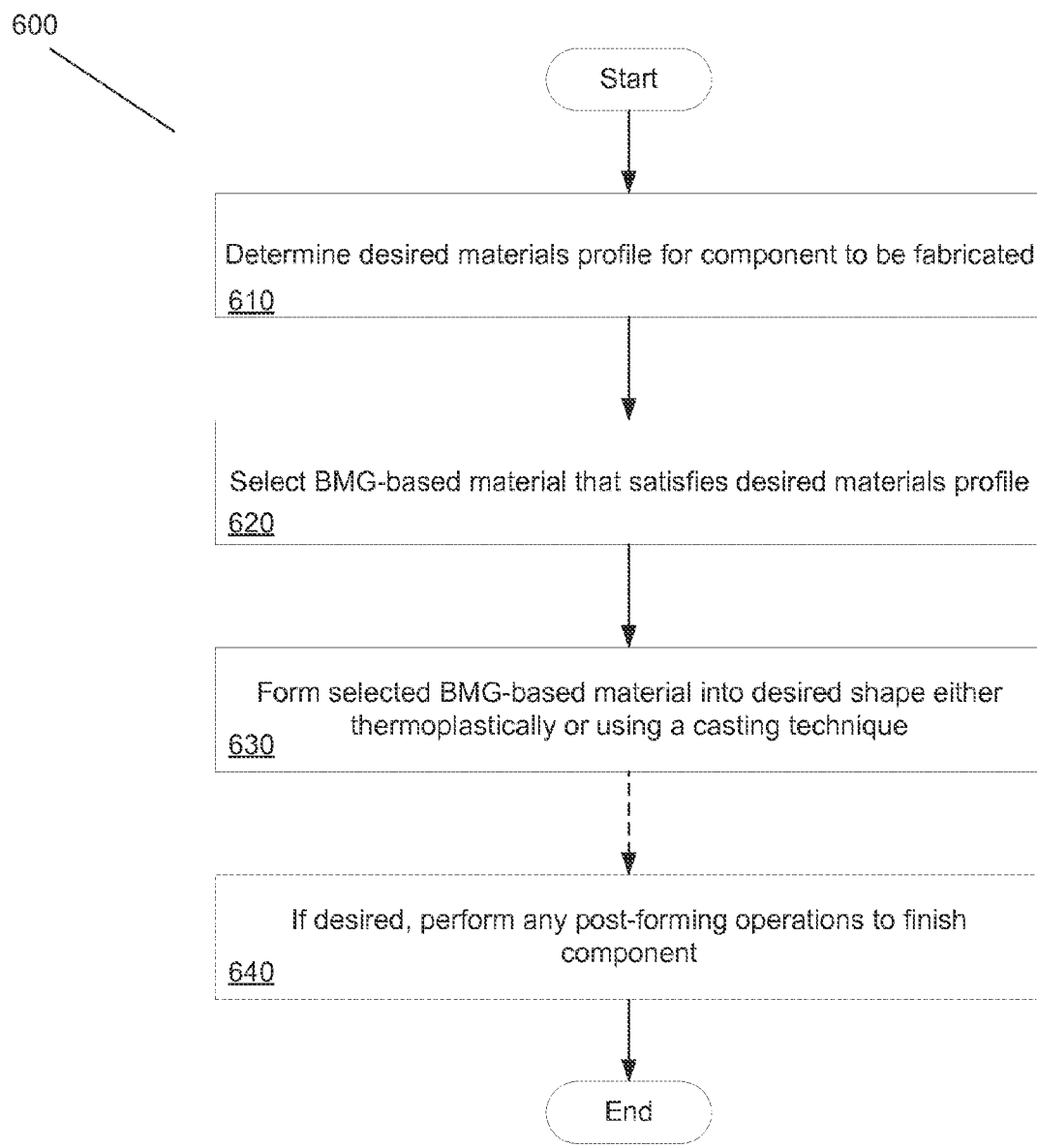
FIG. 6 illustrates a method of forming a BMG-based strain wave gear component in accordance with embodiments of the invention.

A method of fabricating a strain wave gear component that incorporates casting or thermoplastic forming techniques is illustrated in FIG. 6. The process includes determining 610 a desired materials profile for the component to be fabricated. For example, where a flexspline is to be fabricated, it may be desired that the constituent material have a certain stiffness, a certain resistance to fatigue failure, a certain density, a certain resistance to brittle failure, a certain resistance to corrosion, a certain resistance to wear, a certain level of glass-forming ability, etc. In many embodiments, material costs are also accounted for (e.g. certain BMG-based may be more or less expensive than other BMG-based materials). Generally, any parameters can be accounted for in determining 610 the materials profile for the component to be fabricated.

Note that any constituent component of a strain wave gear can be fabricated in accordance with embodiments of the invention. As alluded to above, because the flexspline and the ball bearing are subject to periodic deformation, it may be particularly advantageous that they be formed from a material having a high resistance to fatigue failure. Moreover, flexsplines and ball bearings may also benefit from being formed from a material that possesses excellent resistance to wear, since those components experience constant contact and relative motion during the normal operation of a strain wave gear (the gear teeth of the flexspline are subject to wear and the balls and inner and outer races of the ball bearing may experience wear). In some embodiments the balls of the ball bearing are fabricated from BMG-based materials—in this way, the balls of the ball bearing can benefit from the enhanced wear resistance that BMG-based materials can offer.

But it should be clear that any of the components of a strain wave gear can be fabricated from BMG-based materials in accordance with embodiments of the invention. In some embodiments, the gear teeth of the circular spline are fabricated from BMG-based materials. In this way, the gear teeth of the circular spline can benefit from the enhanced wear-performance characteristics that BMG-based materials can offer. In some embodiments, the gear teeth of the circular spline that are fabricated from a BMG-based material are thereafter press-fit into a different, stiffer material—for example beryllium and titanium—to form the circular spline, bearing in mind that it would be beneficial for the circular spline to be relatively rigid to support the motion of the flexspline and the wave generator. In this way, BMG-based materials are implemented in the gear teeth of the circular spline where they can offer enhanced wear performance, and a stiffer material can form the remainder of the circular spline where it can offer enhanced structural support.

In many embodiments, the majority of the constituent components of a strain wave gear are fabricated from the same BMG-based materials—in this way, the respective strain wave gear can have a more uniform coefficient of thermal expansion. In any case, it should be clear that any of the constituent components of a strain wave gear can be fabricated from a BMG-based material in accordance with embodiments of the invention.

Returning to FIG. 6, a BMG-based material is selected 620 that satisfies the determined materials profile. Any suitable BMG-based material can be selected, including any of those listed above in Tables 1-5, and depicted in FIGS. 4A-4B and 5. In many embodiments, BMG-based materials are particularly developed to satisfy the determined 610 materials profile, and are thereby selected 620. For example, in many embodiments, given BMG-based materials are developed by alloying (e.g. as discussed above) in any suitable way to tweak the materials properties. In a number of embodiments, a BMG-based material is developed by modifying the ratio of crystalline structure to amorphous structure (e.g. as discussed above) to tweak the materials properties. Of course, any suitable way of developing BMG-based materials that satisfy the determined 610 materials properties may be implemented in accordance with embodiments of the invention.

Figure 7A:
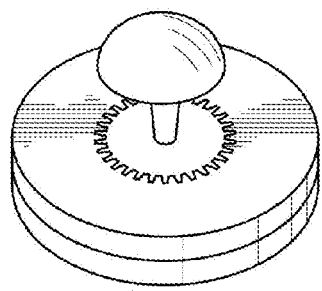
FIGS. 7A-7D illustrate the formation of a gear using casting techniques in accordance with embodiments of the invention.
Figure 7B:
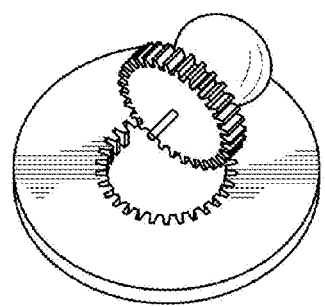
Figure 7C:
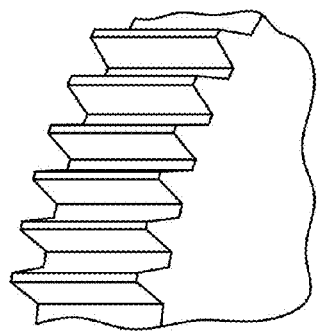
Figure 7D:
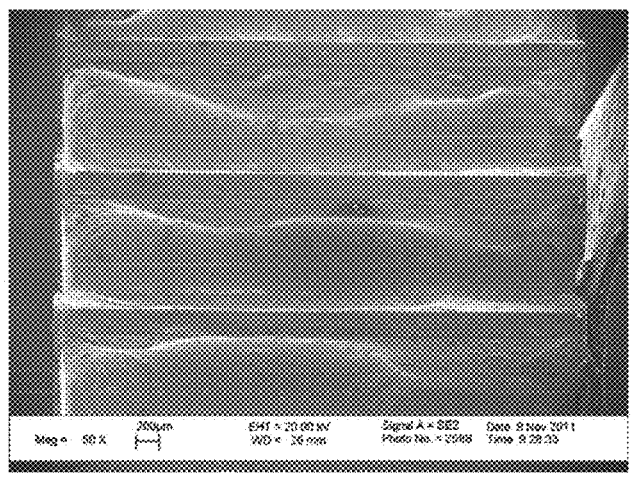

The selected 620 BMG-based material is formed into the desired shape (e.g. the shape of the component to be fabricated), for example thermoplastically or using a casting technique. While the fabrication of gear-type components from BMG-based materials via casting and/or thermoplastic techniques is not currently widespread, the inventors of the instant application have demonstrated the viability of such techniques for this purpose. For example, FIGS. 7A-7D illustrate a gear having a 1 inch radius that has been fabricated from a BMG-based material using a single casting step. In particular, FIG. 7A illustrates the steel mold that was used in the formation of the gear. FIG. 7B illustrates removal of the BMGMC material the steel mold. FIGS. 7C and 7D illustrate SEM images demonstrating the fidelity of the fabricated component. Notably, the gear teeth were also implemented using this method of fabrication. In this way, the intricate and expensive machining of the gear teeth can be avoided (by contrast, steel-based strain wave gear components typically rely on machining in the formation of the component). Thus, in accordance with this teaching, in many embodiments, BMG-based materials are thermoplastically formed or cast into the shapes of the constituent components of a strain wave gear. In many embodiments, BMG-based materials are thermoplastically formed or cast into the shapes of the constituent components including the shapes of the gear teeth. Note also that any suitable thermoplastic forming or casting technique can be implemented in accordance with embodiments of the invention. For example, the constituent components of a strain wave gear can be formed by one of: a direct casting technique, forging technique, a spin forming technique, a blow molding technique, a centrifugal casting technique, a thermoplastic forming technique using BMG-based powder, etc. As one of ordinary skill in the art would appreciate, the BMG based material must be cooled sufficiently rapidly to maintain at least some amorphous structure. Of course it should be noted that strain wave gear components can be formed from BMG-based materials in any suitable manner, including by machining, in accordance with embodiments of the invention.

Figure 8A:
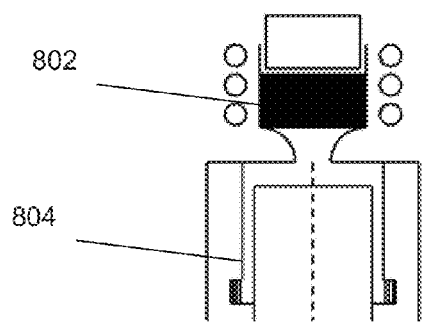
FIGS. 8A-8D illustrate the fabrication of a strain wave gear component using a casting technique in accordance with embodiments of the invention.
Figure 8B:
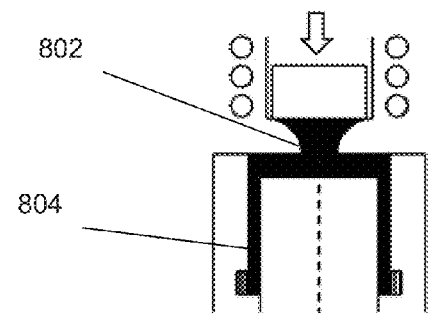
Figure 8C:
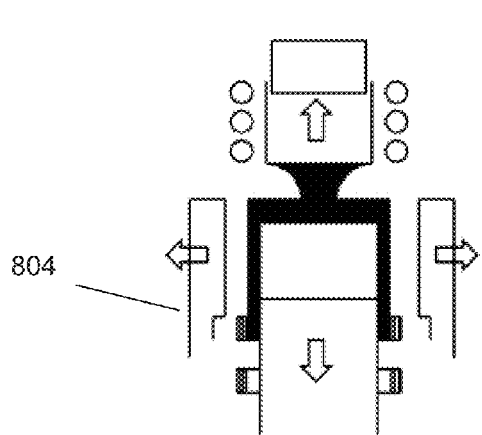
Figure 8D:
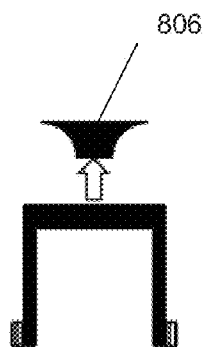

As an example, FIGS. 8A-8D illustrate a direct casting technique that can be implemented to form a constituent component of a strain wave gear in accordance with embodiments of the invention. In particular, FIG. 8A depicts that a molten BMG-based material 802 that has been heated to a molten state and is thereby ready to be inserted into a mold 804. The mold 804 helps define the shape of the component to be formed. FIG. 8B depicts that the molten BMG-based material 802 is pressed into the mold 804. FIG. 8C depicts that the mold 804 is released after the BMG-based material has cooled. FIG. 8D depicts that any excess flash 806 is removed. Thus, it is depicted that a strain wave gear component can be fabricated using direct casting techniques in conjunction with a BMG-based material in accordance with embodiments of the invention. Note that it is generally not feasible to cast crystalline metals that are suitable for implementation within strain wave gear components.

Figure 9A:
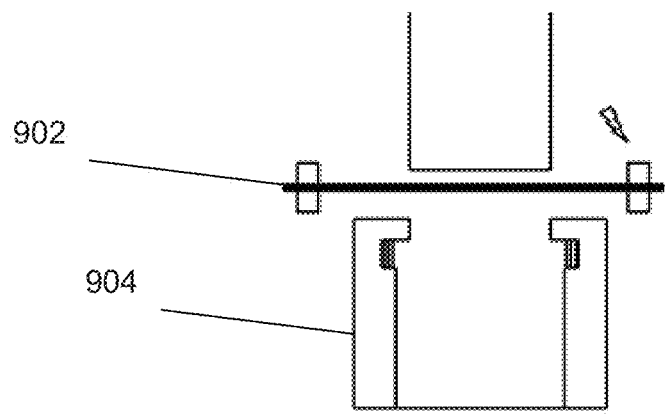
FIGS. 9A-9C illustrate the fabrication of a strain wave gear component using a BMG-based material in the form of a sheet in conjunction with a thermoplastic forming technique in accordance with embodiments of the invention.
Figure 9B:
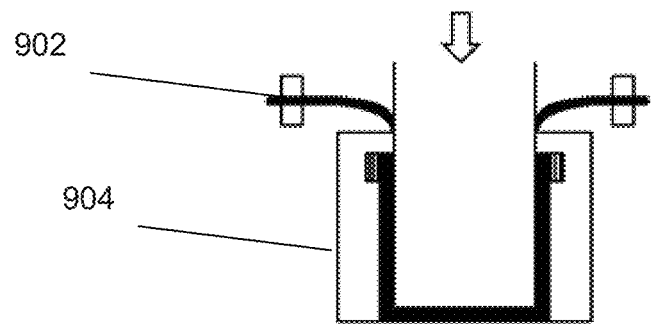
Figure 9C:
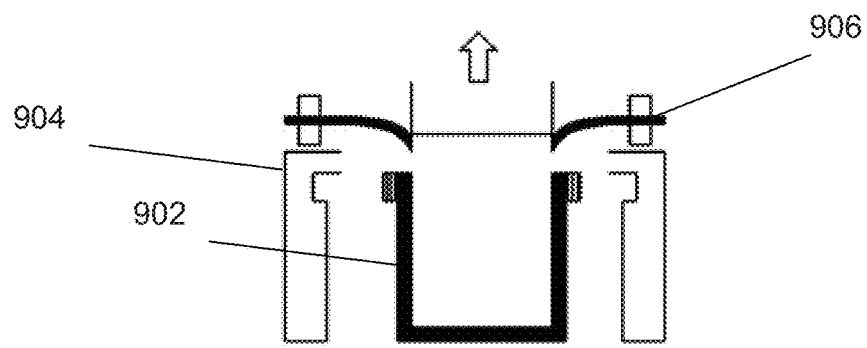

FIGS. 9A-9C illustrate another forming technique that can be implemented in accordance with embodiments of the invention. In particular, FIGS. 9A-9C illustrate the thermoplastic forming of a BMG-based material that is in the form of a sheet in accordance with embodiments of the invention. Specifically, FIG. 9A depicts that a sheet of BMG-based material 902 that has been heated such that thermoplastic forming can be implemented. In the illustrated embodiment, the sheet of BMG-based material 902 is heated via a capacitive discharge technique, but it should be understood that any suitable method of heating can be implemented in accordance with embodiments of the invention. FIG. 9B depicts that a press is used to force the BMG-based material into the mold 904 to form the component to be fabricated. FIG. 9C depicts that the mold 904 is released and any excess flash 906 is removed. Thus, the desired component is achieved.

Figure 10A:
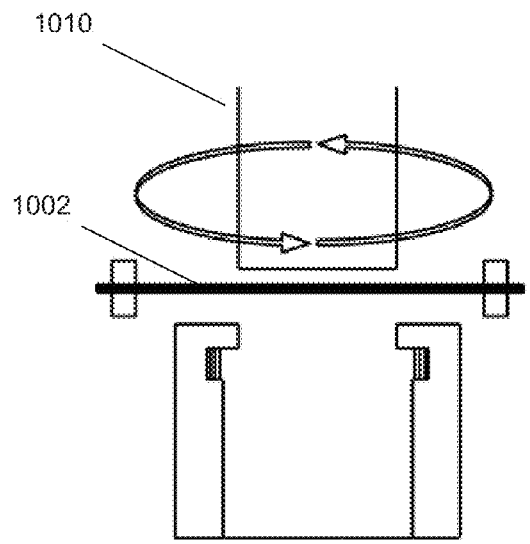
FIGS. 10A-10C illustrate the fabrication of a strain wave gear component using a spin forming technique in accordance with embodiments of the invention.
Figure 10B:
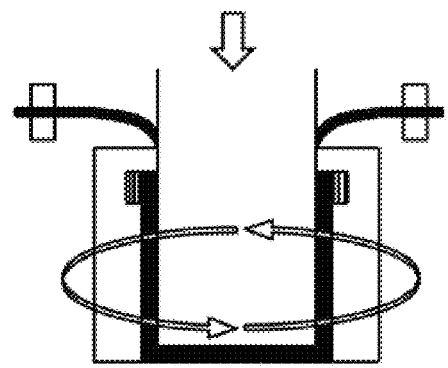
Figure 10C:
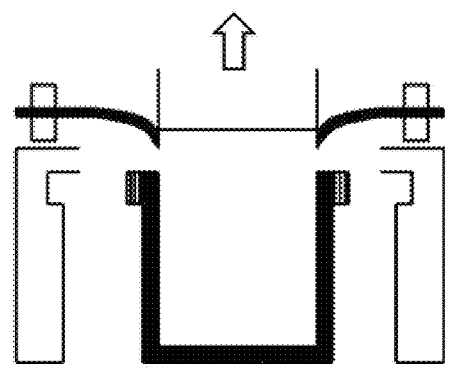

As mentioned above, the heating of the BMG-based material so that it is capable of thermoplastic forming can be achieved in any suitable way in accordance with embodiments of the invention. For example, FIGS. 10A-10C depict that the heating of BMG-based material in the form of a sheet can be accomplished by spinning friction. FIGS. 10A-10C are similar to those seen in FIGS. 9A-9C except that the BMG-based sheet material is heated frictionally by the rotation of the press 1010 as it is pressed against the BMG-based material 1002. In this way, the BMG-based material can be heated to an extent that it can be thermoplastically formed. This technique has been referred to as 'spin forming.'

Note that although the above descriptions regard mechanically conforming BMG-based material to mold, BMG-based material can be formed into a mold in any suitable way in accordance with embodiments of the invention. In many embodiments, the BMG-based material is made to conform to the mold using one of: a forging technique, a vacuum-based technique, a squeezing technique, and a magnetic forming technique. Of course, the BMG-based material can be made to conform to a mold in any suitable fashion in accordance with embodiments of the invention.

Figure 11A:
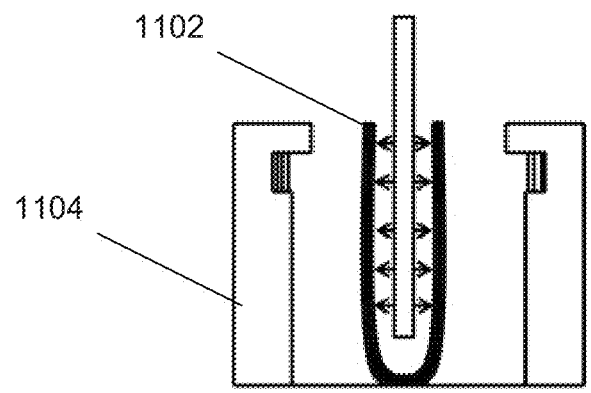
FIGS. 11A-11C illustrate the fabrication of a strain wave gear component using a blow molding technique in accordance with embodiments of the invention.
Figure 11B:
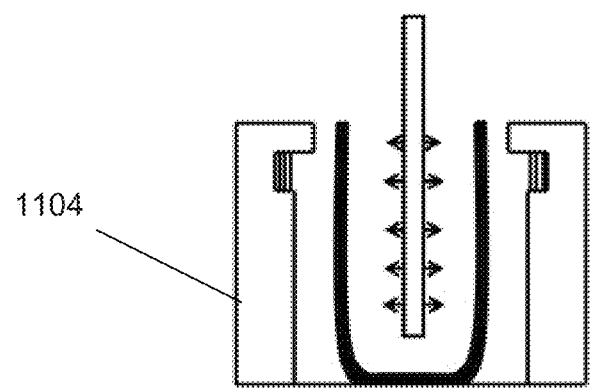
Figure 11C:
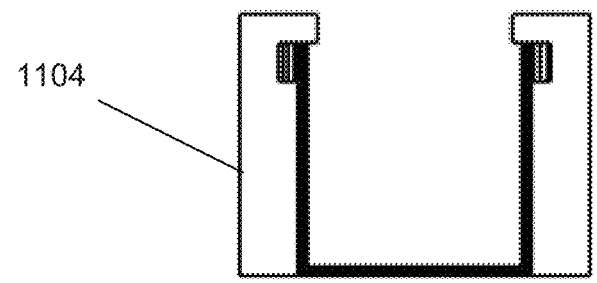

FIGS. 11A-11C depict the forming a part using blow molding techniques. In particular, FIG. 11A depicts that a BMG-based material is placed within a mold. FIG. 11B depicts that the BMG-based material 1102 is exposed to pressurized gas or liquid that forces the BMG-based material to conform to the shape of the mold 1104. Typically, a pressurized inert gas is used. As before, the BMG-based material 1102 is usually heated so that it is sufficiently pliable and can be influenced by the pressurized gas or liquid. Again, any suitable heating technique can be implemented in accordance with embodiments of the invention. FIG. 11C depicts that due to the force of the pressurized gas or liquid, the BMG-based material conforms to the shape of the mold 1104.

Figure 12A:
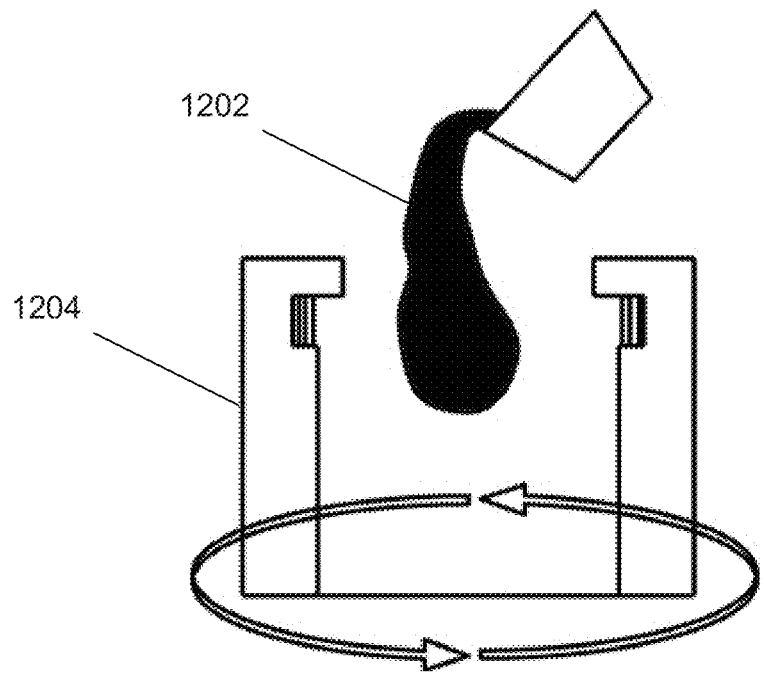
FIGS. 12A-12B illustrate using centrifugal casting to form a strain wave gear component in accordance with embodiments of the invention.
Figure 12B:
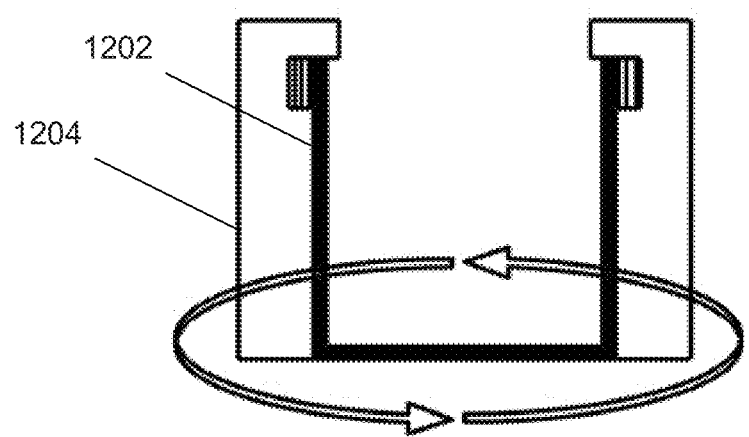

FIGS. 12A and 12B depict that centrifugal casting can be implemented to form the constituent component of the strain wave gear. In particular, FIG. 12A depicts that molten BMG-based material 1202 is poured into a mold 1204, and that the mold is rotated so that the molten BMG-based material conforms to the shape of the mold.

Figure 13A:
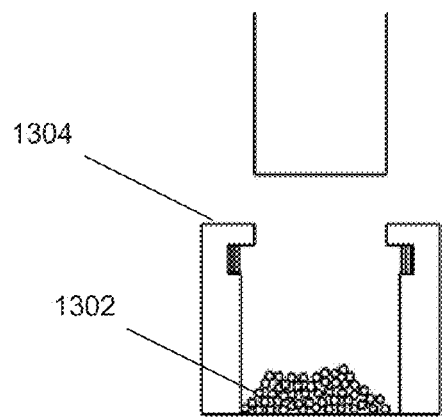
FIGS. 13A-13C illustrate forming a strain wave gear component by thermoplastically forming BMG-based material in the form of powder in accordance with embodiments of the invention.
Figure 13B:
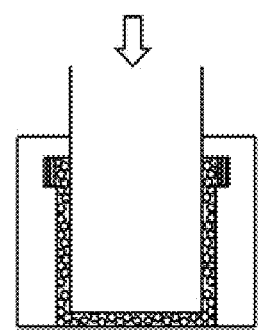
Figure 13C:
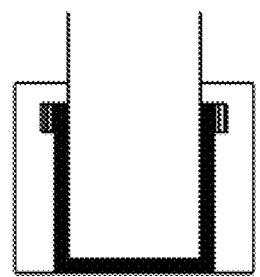

FIGS. 13A-13C depict that BMG-based material can be inserted into a mold in the form of powder, subsequently heated so that the material is thermoplastically formable, and thereby made to form the shape of the desired constituent component in accordance with embodiments of the invention. In particular, FIG. 13A depicts that BMG-based material in the form of powder 1302 is deposited within a mold. FIG. 13B depicts that the BMG-based material 1302 is heated and pressed so as to conform to the shape of the mold 1304. And FIG. 13C depicts that the BMG-based material has solidified and thereby formed the desired component.

In general, it should be clear that any suitable technique for thermoplasticallly forming or casting the BMG-based material can be implemented in accordance with embodiments of the invention. The above-described examples are meant to be illustrative and not comprehensive. Even more generally, any suitable technique for forming a strain wave gear component that constitutes a BMG-based material can be implemented in accordance with embodiments of the invention.

Figure 14:
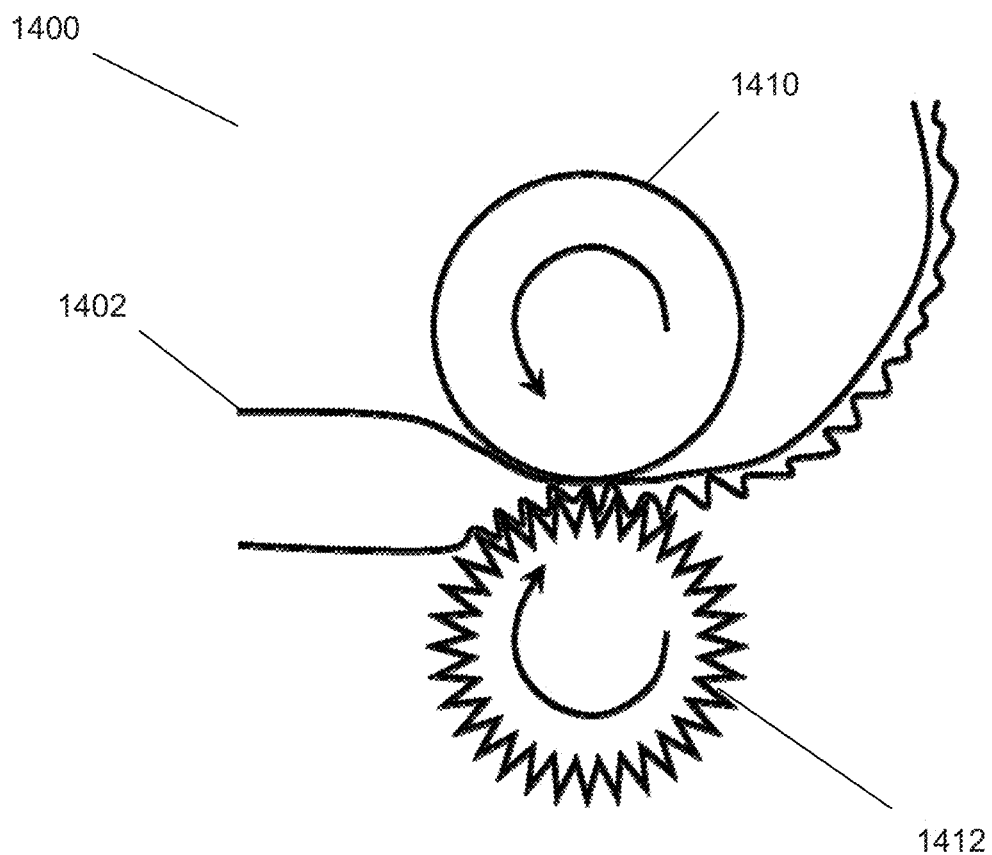
FIG. 14 illustrates using twin roll forming to implement gear teeth onto a BMG-based strain wave gear component in accordance with embodiments of the invention.

Referring back to FIG. 6, the process 600 further includes, if desired, performing 640 any post-forming operations to finish the fabricated component. For example, in some embodiments, the general shape of a flexspline is thermoplastically formed or cast, and gear teeth are subsequently machined onto the flexspline. In some embodiments a twin-roll forming technique is implemented to install gear teeth onto a flexspline or a circular spline. FIG. 14 depicts a twin roll forming arrangement that can be used to implement gear teeth onto a flexspline. In particular, the arrangement 1400 includes a first roller that supports the motion of a flexspline 1402 through the arrangement, and a second roller 1412 that acts to define the gear teeth onto the flexspline. The flex spline 1402 can be heated so that it is more pliable and ready to be defined by the second roller. Of course, the formed part can be finished using any suitable technique in accordance with embodiments of the invention. For example, gear teeth can be implemented using traditional machining techniques. Additionally, the formed part can be finished in any suitable way—not just to define gear teeth—in accordance with embodiments of the invention.

Figure 15A:
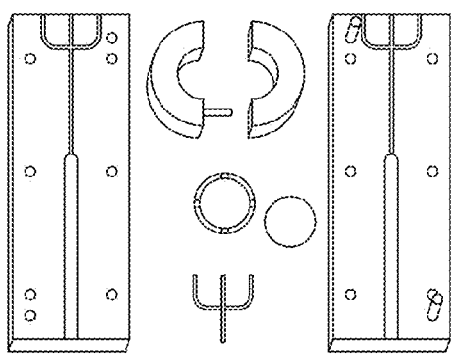
Figure 15B:
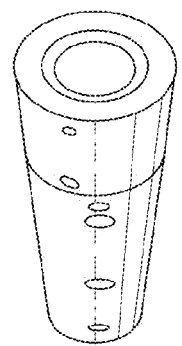
Figure 15C:
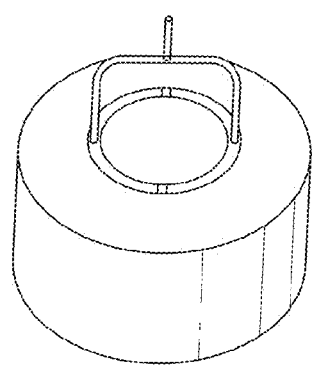
Figure 15D:
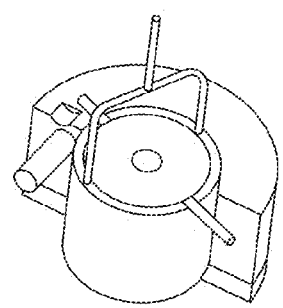

FIGS. 15A-15F illustrate the fabrication of a flexspline in accordance with the process outlined in FIG. 6. In particular: FIG. 15A depicts a multi-piece mold that is used to cast the general shape of the flexspline; FIG. 15B depicts the assembled multi-piece mold that is used to cast the general shape of the flexspline; FIG. 15C illustrates the casting of the flexspline using BMG-based material; FIG. 15D illustrates the disassembling the mold; FIG. 15E illustrates the flexspline as it has been removed from the mold; and FIG. 15F illustrates that a flexspline can be machined to include gear teeth after being cast from a BMG-based material. Bear in mind that although the illustration depicts that gear teeth are machined onto the flexspline, the flexspline could have been cast to include the desired gear teeth. In this way, costly machining processes can be avoided.

Figure 16:
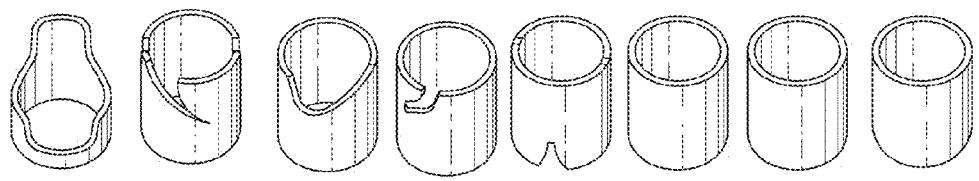
FIG. 16 illustrate that casting processes should be well-controlled in fabricating a strain wave gear component in accordance with embodiments of the invention.

Note that the formation techniques are extremely sensitive to process control. In general, it is beneficial to have precise control over the fluid flow, venting, temperature, and cooling when forming the part. For example, FIG. 16 illustrates several attempts at forming the flexspline using a casting technique, and many of the attempts are clearly imperfect. In particular, the 7 samples to the left of the image were fabricated using a TiZrCuBe BMG-based material having a density of 5.3 g/cm$^3$. The right-most sample in the image was fabricated from Vitreloy 1.

Figure 17:
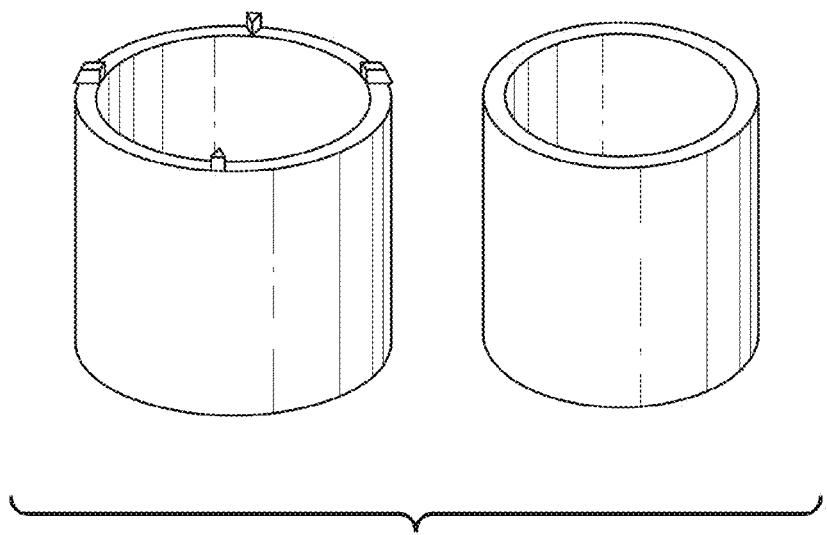
FIG. 17 illustrates that strain wave gear components can be fabricated on any suitable scale in accordance with embodiments of the invention.

FIG. 17 illustrates that the above-described processes can be used to create parts of varying scale. As an example, FIG. 17 illustrates a larger flexspline fabricated in accordance with the above-described processes, as well as a smaller flexspline fabricated in accordance with the above-described processes. In this way, the above-described processes are versatile.

Figure 18A:
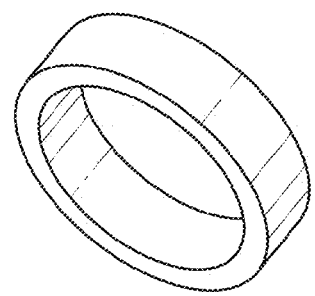
FIGS. 18A-18B illustrate the fabrication of a circular spline in accordance with embodiments of the invention.
Figure 18B:
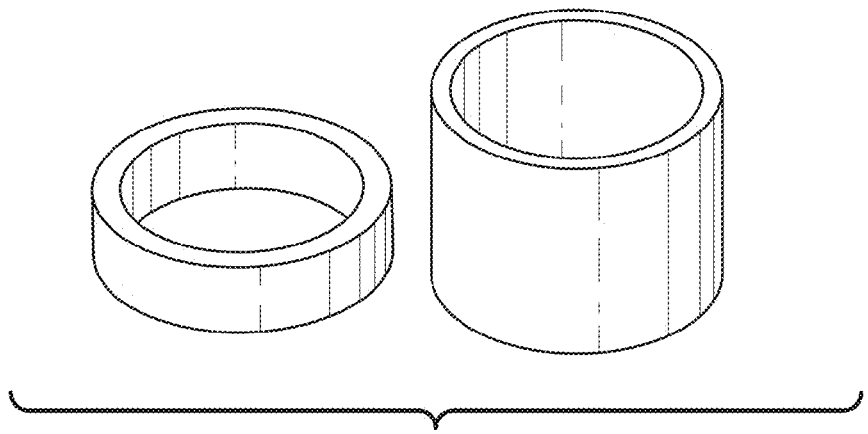

It should be understood that although FIGS. 15-17 regard the fabrication of a flexspline, any strain wave gear component can be fabricated from a BMG-based material in accordance with embodiments of the invention. For example, FIGS. 18A-18B illustrate a circular spline that has been fabricated from a BMG-based material. Specifically, FIG. 18A illustrates a titanium BMG-based material that has been formed into a 1.5" circular spline; FIG. 18B depicts the fabricated circular spline relative to a fabricated flexspline. Although the circular spline is not depicted as including gear teeth, gear teeth can subsequently be machined into the circular spline.

The above-described fabrication techniques can be used to efficiently fabricate strain wave gears and strain wave gear components. For example, as alluded to above, expenses associated with machining the components can be avoided using these techniques. Accordingly, the cost for fabricating a given strain wave gear component becomes principally a function of the cost of the raw material, and this can be the case irrespective of the size of the component. By contrast, when steel-based strain wave gear components are formed, the cost of manufacturing the part may increase with a reduction in size beyond some critical value. This is because it becomes difficult to machine parts of a smaller size.

Figure 19:
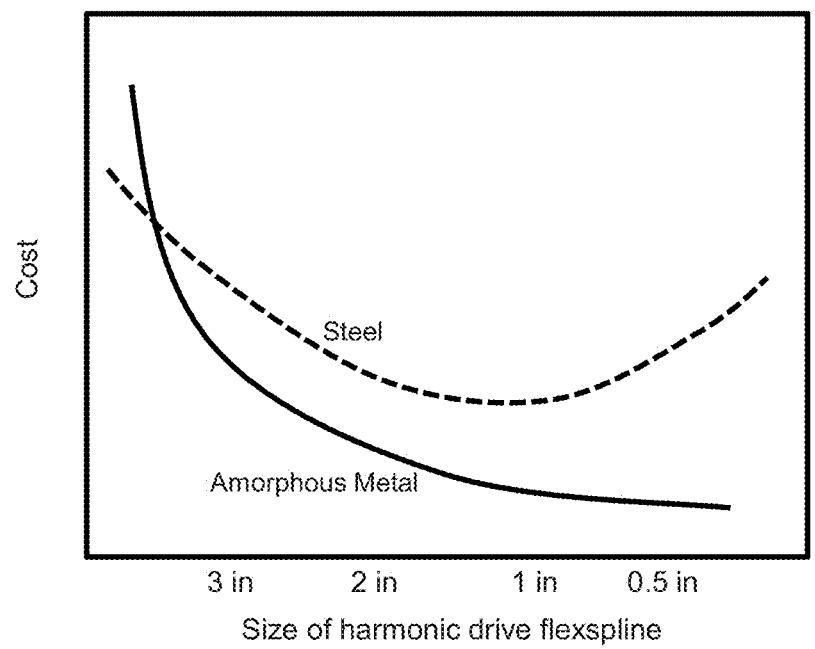
FIG. 19 illustrates the cost benefits of casting or thermoplastically forming strain wave gear components from BMG-based materials in accordance with embodiments of the invention.
Figure 20:
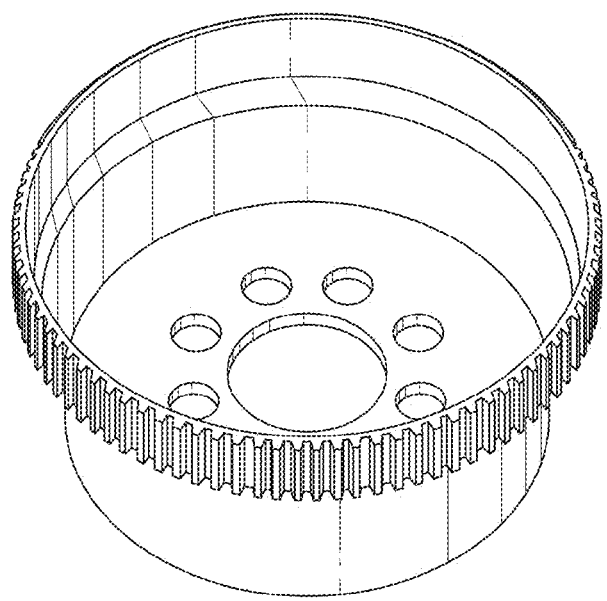
FIG. 20 illustrates a steel-based flexspline.

By way of example, FIG. 19 illustrates this relationship with respect to flexsplines where the cost of raw material for amorphous metal is greater than that of steel. For example, the stiffness of steel may require that flexsplines have a diameter less than some specified amount, e.g. 2 inches, and have a wall thickness of less than some amount, e.g. 1 mm. To provide context, FIG. 20 illustrates a steel-based flexspline 2" in diameter and having a wall thickness of 0.8 mm. Importantly, as flexsplines are made smaller, e.g. below 1 inch in diameter, the wall of the steel becomes too thin to machine easily. As a result, even where the cost of the amorphous metal raw material is greater than that of steel, the flexspline can be cheaper to manufacture from amorphous metal. In essence, burdensome machining could be eliminated by casting the part from a BMG-based material, and the cost of the flexspline can thereby be reduced.

As can be inferred from the above discussion, the above-mentioned concepts can be implemented in a variety of arrangements in accordance with embodiments of the invention. For example, in some embodiments, strain wave gear components are cast from polymeric materials, and subsequently coated with bulk metallic glass-based materials. In this way, the wear resistant properties of bulk metallic glass-based materials can be harnessed. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. A strain wave gear comprising:
   a wave generator;
   a flexspline that itself comprises a first set of gear teeth; and
   a circular spline that itself comprises a second set of gear teeth;
   wherein at least one of the wave generator, the flexspline, and the circular spline, comprises a bulk metallic glass-based material having an elastic limit of greater than or equal to approximately 1%.

2. The strain wave gear of claim 1, wherein the wave generator comprises a wave generator plug and a bearing.

3. The strain wave gear of claim 2, wherein the bearing is a ball bearing.

4. The strain wave gear of claim 1, wherein each of the wave generator, the flexspline, and the circular spline, comprises a bulk metallic glass-based material.

5. The strain wave gear of claim 1, wherein at least one of the first set of gear teeth and the second set of gear teeth comprises a bulk metallic glass-based material.

6. The strain wave gear of claim 1, wherein each of the first set of gear teeth and the second set of gear teeth comprises a bulk metallic glass-based material.

7. The strain wave gear of claim 6, wherein the wave generator comprises a ball bearing that itself comprises a bulk metallic glass-based material.

8. The strain wave gear of claim 1, wherein the element of the bulk metallic glass-based material that is present in the most amount is one of: Fe, Zr, Ti, Ni, Hf, and Cu.

9. The strain wave gear of claim 1, wherein the bulk metallic glass-based material is $Ni_{40}Zr_{28.5}Ti_{16.5}Al_{10}Cu_5$.

10. The strain wave gear of claim 1, wherein the flexspline comprises a bulk metallic glass-based material having an elastic limit of greater than or equal to approximately 1%.

11. The strain wave gear of claim 10, wherein the element of the bulk metallic glass-based material that is present in the most amount is one of: Fe, Zr, Ti, Ni, Hf, and Cu.

12. The strain wave gear of claim 10, wherein the bulk metallic glass-based material is $Ni_{40}Zr_{28.5}Ti_{16.5}Al_{10}Cu_5$.

13. The strain wave gear of claim 1, wherein the bulk metallic glass-based material does not include crystalline phases of material, and is characterized by an entirely amorphous structure.

14. The strain wave gear of claim 1, wherein the bulk metallic glass-based material is a bulk metallic glass matrix composite.

* * * * *